(12) United States Patent
Leinonen et al.

(10) Patent No.: US 10,148,095 B2
(45) Date of Patent: Dec. 4, 2018

(54) METHOD AND APPARATUS FOR COMPENSATING NON-ACTIVE CURRENTS IN ELECTRICAL POWER NETWORKS

(71) Applicant: Merus Power Dynamics Oy, Nokia (FI)

(72) Inventors: Aki Leinonen, Siivikkala (FI); Jyri Öörni, Komi (FI)

(73) Assignee: MERUS POWER DYNAMICS OY, Nokia (FI)

( * ) Notice: Subject to any disclaimer, the term of this patent is extended or adjusted under 35 U.S.C. 154(b) by 507 days.

(21) Appl. No.: 14/777,531

(22) PCT Filed: Mar. 17, 2014

(86) PCT No.: PCT/FI2014/050196
§ 371 (c)(1),
(2) Date: Sep. 16, 2015

(87) PCT Pub. No.: WO2014/147294
PCT Pub. Date: Sep. 25, 2014

(65) Prior Publication Data
US 2016/0285273 A1 Sep. 29, 2016

(30) Foreign Application Priority Data

Mar. 19, 2013 (FI) .................................. 20135263

(51) Int. Cl.
*H02J 4/00* (2006.01)
*H02M 5/458* (2006.01)
(Continued)

(52) U.S. Cl.
CPC .............. *H02J 4/00* (2013.01); *H02J 3/1842* (2013.01); *H02J 3/24* (2013.01); *H02J 7/34* (2013.01);
(Continued)

(58) Field of Classification Search
CPC ........ H02J 4/00; H02J 9/04; H02J 7/34; H02J 3/1842; H02J 3/24; H02J 3/32; H02M 5/458; Y02E 40/22
See application file for complete search history.

(56) References Cited

U.S. PATENT DOCUMENTS 5,283,726 A * 2/1994 Wilkerson .......... H02M 1/4233
323/207
5,514,915 A 5/1996 Kim et al.
(Continued)

FOREIGN PATENT DOCUMENTS

KR 10-2010-0117980 A 11/2010
KR 10-2012-0011237 A 2/2012
(Continued)

OTHER PUBLICATIONS

International Search Report received for International Patent Application No. PCT/FI2014/050196, dated May 19, 2014, 4 pages.
(Continued)

*Primary Examiner* — Jared Fureman
*Assistant Examiner* — Michael Warmflash
(74) *Attorney, Agent, or Firm* — Ziegler IP Law Group, LLC

(57) ABSTRACT

A power conditioning device has a first operating mode where the device compensates non-active current components caused by a load, and a second operating mode where the device disconnects the load from a supply in a voltage sag situation, and also provides reserve power for the load.

18 Claims, 15 Drawing Sheets

(51) Int. Cl.
*H02J 3/18* (2006.01)
*H02J 3/24* (2006.01)
*H02J 7/34* (2006.01)
*H02J 9/04* (2006.01)
*H02J 3/32* (2006.01)

(52) U.S. Cl.
CPC .............. *H02J 9/04* (2013.01); *H02M 5/458* (2013.01); *H02J 3/32* (2013.01); *Y02E 40/22* (2013.01)

(56) References Cited

U.S. PATENT DOCUMENTS

| | | | |
|---|---|---|---|
| 5,771,161 A | 6/1998 | Jackson et al. | |
| 5,883,796 A * | 3/1999 | Cheng .................. | H02J 3/1814 307/105 |
| 6,104,102 A * | 8/2000 | Tsuji ...................... | H02J 9/062 307/31 |
| 6,118,676 A | 9/2000 | Divan et al. | |
| 6,215,202 B1 * | 4/2001 | Luongo .................. | H02J 15/00 307/23 |
| 6,498,464 B1 * | 12/2002 | Doht ........................ | H02J 3/04 323/247 |
| 7,158,393 B2 * | 1/2007 | Schneider ............. | H02J 3/1842 363/34 |
| 2005/0116691 A1 | 6/2005 | Bijlenga | |
| 2006/0202636 A1 | 9/2006 | Schneider | |

FOREIGN PATENT DOCUMENTS

| | | | |
|---|---|---|---|
| WO | 2012025660 A1 | 3/2012 | |
| WO | WO 2012025660 A1 * | 3/2012 | ................ H02J 3/01 |

OTHER PUBLICATIONS

Written Opinion of International Searching Authority; PCT/FI2014/050196, dated May 19, 2014, 7 pages.
Office Action received for Finnish Patent Application No. 20135263, dated Jan. 17, 2014, 6 pages.
Extended European Search Report, Application No. 14767602.7-1804/ 2976821 PCT/FI2014/050196, dated Oct. 11, 2016, 8 pages.
Notice of Allowance received for Korean Patent Application No. 10-2015-7028087, dated Feb. 1, 2018, 3 pages including 1 page of English translation.

* cited by examiner

METHOD AND APPARATUS FOR COMPENSATING NON-ACTIVE CURRENTS IN ELECTRICAL POWER NETWORKS

FIELD OF THE INVENTION

The invention relates to generating compensating currents in electrical power networks.

BACKGROUND

Poor power quality may cause various problems in electrical power networks. The power flow should preferably have a pure sinusoidal waveform and it should remain within specified voltage and frequency tolerances. In today's electrical networks, deviations from these ideal conditions are frequent due to increasing non-linear and other loads, which disturb the power network.

Waveform distortion may be caused e.g. due to thyristor power control, which utilizes phase-fired power regulation. Deviations from the ideal sinusoidal waveform may also be caused e.g. by rapidly fluctuating loads such as arc furnaces, and welding devices.

A distorted current waveform may be difficult or impossible to correct by using only passive electrical filters.

A distorted waveform may be decomposed into spectral components. In particular, the waveform may be represented as a sum of harmonic components. The waveform distortion may be at least partially compensated by suppressing harmonic components.

SUMMARY

An object of the invention is to provide a device for generating compensating currents. An object of the invention is to provide a method for generating compensating currents.

According to a first aspect of the invention, there is provided a device for generating compensating currents, the device comprising:
  a switch bridge,
  an inductor unit,
  an energy storage unit,
  a control unit,
  a signal input for receiving a first monitoring signal indicative of the voltages of input nodes of a three-phase alternating current network,
  a signal output for controlling a switch unit, and
  output nodes connectable to a load,
wherein the control unit is configured to enable operation in a first operating mode when the first monitoring signal indicates a normal voltage situation, and the control unit is configured to enable operation in a second operating mode when the first monitoring signal indicates a voltage sag situation;
wherein in the first operating mode:
  the switch bridge and the inductor unit are arranged to provide at least a first compensating current so as to compensate a non-active component of a load current drawn from the first output node, wherein the switch bridge and the inductor unit are arranged to generate the first compensating current by transferring energy from the network to the energy storage unit, and by transferring energy back from the energy storage unit to the network; and
in the second operating mode:
  the control unit is configured to send a control signal to the switch unit for disconnecting the input nodes from the output nodes, and
  the switch bridge and the inductor unit are arranged to provide at least a first auxiliary current so as to provide reserve power for the load during the voltage sag situation, wherein the switch bridge and the inductor unit are arranged to generate the first auxiliary current by transferring energy from the energy storage unit.

According to a second aspect of the invention, there is provided a method for generating compensating currents for a three-phase alternating current network, the method comprising:
  enabling operation in a first operating mode when the three-phase alternating current network is detected to have normal voltages,
  enabling operation in a second operating mode when a voltage sag situation is detected;
wherein in the first operating mode:
  the switch bridge and the inductor unit provide at least a first compensating current so as to compensate a non-active component of a load current drawn from the first output node, wherein the switch bridge and the inductor unit generate the first compensating current by transferring energy from the network to the energy storage unit, and by transferring energy back from the energy storage unit to the network; and
in the second operating mode:
  the input nodes are disconnected from the output nodes by a switch unit,
  the switch bridge and the inductor unit provide at least a first auxiliary current so as to provide reserve power for the load during the voltage sag situation, wherein the switch bridge and the inductor unit generate the first auxiliary current by transferring energy from the energy storage unit.

A load may draw a distorted current waveform from an electrical power network. The distorted current waveform may disturb operation of other loads connected to the network. The distorted current waveform may be compensated by feeding one or more compensating currents to the network. The network may comprise a power conditioning device, which is arranged to generate the compensating currents according to the distorted load currents. The power conditioning device may generate the compensating currents such that the distorted load currents do not significantly disturb the operation of other loads connected to the network.

The power conditioning device may have a first operating mode where the device compensates non-active current components caused by the load, and a second operating mode where the device disconnects the load from a supply in a voltage sag situation, and also provides reserve power for the load.

The compensating currents may be generated by transferring energy from the network to an energy storage unit, and by transferring energy from the energy storage back to the network. The power conditioning device may comprise inductors and a switch bridge, which are arranged to transfer energy from the network to the energy storage unit, and from the energy storage unit back to the network.

The voltages of the network may sometimes be too low due to a problem in a primary power supply, due to a problem in the network, and/or due to a problem in another load. This situation may be called e.g. as a voltage sag situation. The power conditioning device may be arranged to rapidly disconnect a load from the primary supply when one or more voltages of the network are detected to be too low. The load may be kept disconnected from the primary supply during a reserve period such that energy is not directly transferred from the primary supply to the load during the reserve period. The power conditioning device may be arranged to connect the load to the primary supply when the voltages of the primary supply are detected to be normal again.

The energy stored in the energy storage unit may be utilized to provide reserve power for the load during the reserve period. The power conditioning device may be rated to provide a nominal reserve power during a nominal reserve period, whose length may be e.g. in the range of 0.1 s to 100 s. The nominal reserve power may be e.g. in the range of 5 kW to 10 MW.

The reserve power may be provided by using the same inductors and the same switch bridge, which are used for generating the compensating currents.

In an embodiment, the power conditioning device may be arranged to provide reserve power substantially without transferring energy from the primary power supply during the reserve period.

In an embodiment, the device and the method may be used for compensating imbalance of load currents.

The power conditioning device may have a first operating mode where the device compensates load current imbalance caused by a load, and a second operating mode where the device disconnects the load from a supply in a voltage sag situation, and also provides reserve power for the load.

In an embodiment, the device and the method may be used for compensating reactive power. Compensation of reactive power by using only passive components may be problematic when the reactive power varies rapidly in time. The device and the method may also be used for compensating rapidly varying reactive power.

The embodiments of the invention and their benefits will become more apparent to a person skilled in the art through the description and examples given herein below, and also through the appended claims.

DETAILED DESCRIPTION

Figure 1:
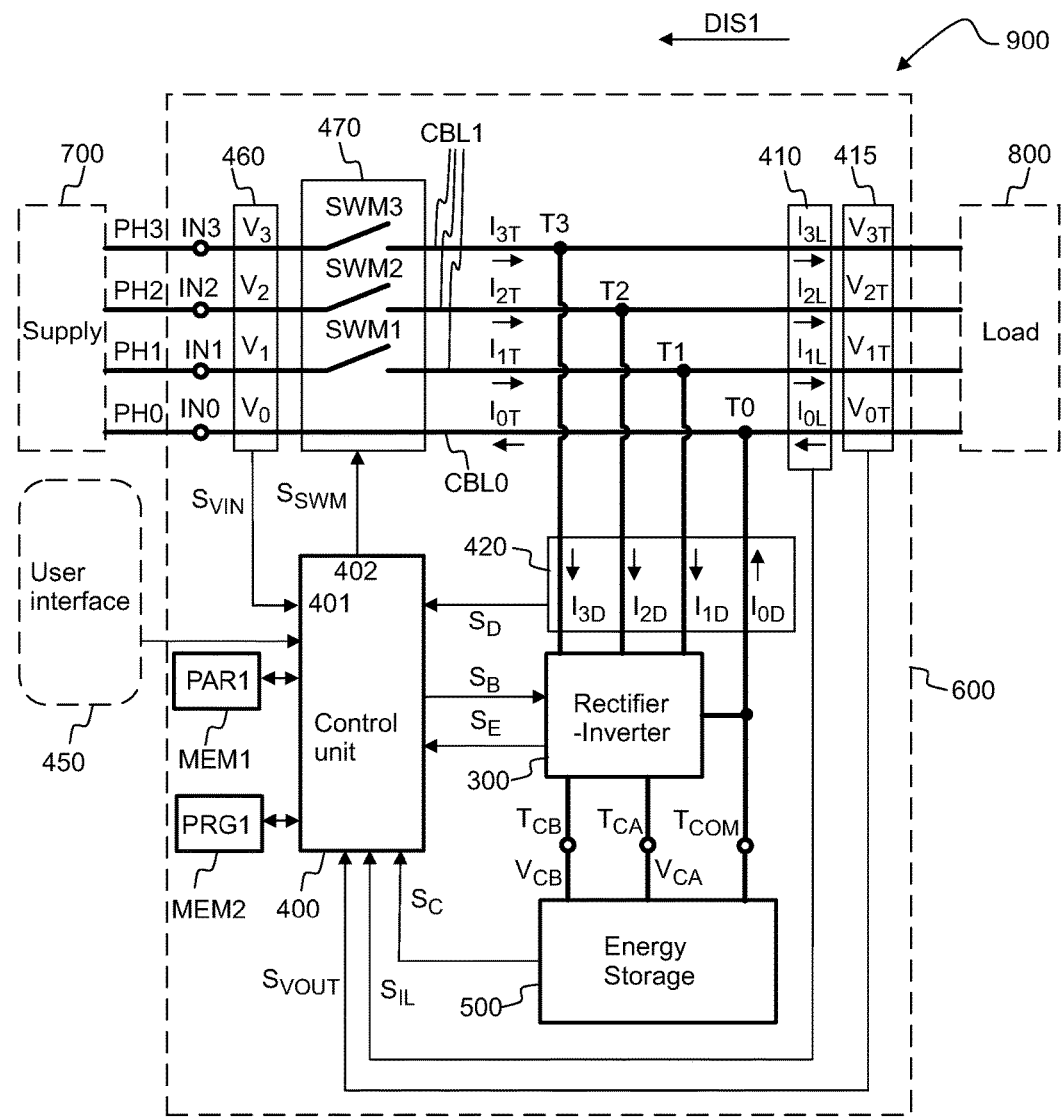
FIG. 1 shows a block diagram of a power conditioning device connected to an energy distribution system.

Referring to FIG. 1, an energy distribution system 900 may comprise conductors CBL1, which are arranged to transfer electrical energy from a primary power supply 700 to a load 800. The energy distribution system 900 may be e.g. a three-phase electric power network 900. The primary supply 700 may provide three-phase alternating currents $I_{1T}$, $I_{2T}$, $I_{3T}$ to input nodes IN1, IN2, IN3. The currents $I_{1T}$, $I_{2T}$, $I_{3T}$ may be called e.g. as input currents. The conductors CBL1 may be arranged to conduct the input currents $I_{1T}$, $I_{2T}$, $I_{3T}$ from the input nodes IN1, IN2, IN3 to output nodes T1, T2, T3. The node IN1 may be an input node for the first phase PH1, the node IN2 may be an input node for the second phase PH2, and the node IN3 may be an input node for the third phase PH3.

The system 900 may optionally comprise an input node IN0 for the neutral phase PH0. A conductor CBL0 may be optionally arranged to conduct a current $I_{0T}$ from the input node IN0 to an output node T0. In case of balanced input currents $I_{1T}$, $I_{2T}$, $I_{3T}$, the input current $I_{0T}$ may be substantially equal to zero, and the conductor CBL0 and/or the input node IN0 may be omitted.

The load 800 may be connected to two or more of the output nodes T0, T1, T2, T3. The load 800 may be connected to one or more of the output nodes T1, T2, T3, and to the output node T0. For example, the load 800 may be connected to the output nodes T0 and T1 such that it is not connected to the output nodes T2 and T3. For example, the load 800 may be connected to the output nodes T0, T1 and T2 such that it is not connected to the output node T3. For example, the load 800 may be connected to the output nodes T0, T1, T2 and T3.

The load 800 may draw load currents $I_{0L}$, $I_{1L}$, $I_{2L}$, and/or $I_{3L}$ from the output nodes T0, T1, T2, T3. One or more of the load currents $I_{0L}$, $I_{1L}$, $I_{2L}$, $I_{3L}$ may have a distorted waveform. The distorted waveform may be interpreted to represent an electric disturbance DIS1, which is transmitted from the load 800. A power conditioning device 600 may be connected to the network 900 so as to attenuate the disturbance DIS1 by adding one or more compensating currents $I_{0D}$, $I_{1D}$, $I_{2D}$, $I_{3D}$ to the load currents $I_{0L}$, $I_{1L}$, $I_{2L}$, $I_{3L}$.

The power conditioning device 600 may be arranged to monitor the load currents $I_{0L}$, $I_{1L}$, $I_{2L}$, $I_{3L}$, and to generate the compensating currents $I_{0D}$, $I_{1D}$, $I_{2D}$, $I_{3D}$, which may be added to the load currents $I_{1L}$, $I_{2L}$, $I_{3L}$ at the output nodes T0, T1, T2, T3. The input current $I_{1T}$ of the first phase PH1 may be equal to the sum of the load current $I_{1L}$ and the compensating current $I_{1D}$. The input current $I_{2T}$ of the second phase PH2 may be equal to the sum of the load current $I_{2L}$ and the compensating current $I_{2D}$. The input current $I_{3T}$ of the third phase PH3 may be equal to the sum of the load current $I_{3L}$ and the compensating current $I_{3D}$. The input current $I_{0T}$ of the neutral phase PH0 may be equal to the sum of the load current $I_{0L}$ and the compensating current $I_{0D}$. As a result, the output nodes T0, T1, T2, T3 may draw input currents $I_{0T}$, $I_{1T}$, $I_{2T}$, $I_{3T}$ from the input nodes IN0, IN1, IN2, IN3.

The power conditioning device 600 may be arranged to generate the compensating currents $I_{0D}$, $I_{1D}$, $I_{2D}$, $I_{3D}$ such that the input currents $I_{1T}$, $I_{2T}$, $I_{3T}$ drawn from supply 700 via the input nodes IN1, IN2, IN3 may fulfill one or more predetermined quality criterions. The power conditioning device 600 may be arranged to compensate one or more non-active current components caused by the load 800. Compensating a non-active current component caused by the load 800 may comprise compensating an imbalance of the load currents. Compensating a non-active current component caused by the load 800 may comprise suppressing harmonic distortion generated by the load 800. Compensating a non-active current component caused by the load 800 may comprise compensating a reactive component of a load current. The power conditioning device 600 may be arranged to compensate an imbalance of the load currents $I_{1L}$, $I_{2L}$, $I_{3L}$ or the different phases PH1, PH2, PH3. The power conditioning device 600 may be arranged to suppress a harmonic distortion generated by the load 800.

Also a second load (not shown) may be connected to the input nodes IN1, IN2, IN3 of the network 900. Thanks to using the compensating currents $I_{0D}$, $I_{1D}$, $I_{2D}$, $I_{3D}$, the disturbance DIS1 may be substantially attenuated before it is coupled from the load 800 to the second load. In an embodiment, propagation of the disturbance DIS1 from the load 800 to the second load and/or to the supply 700 may be substantially prevented.

Figure 5:
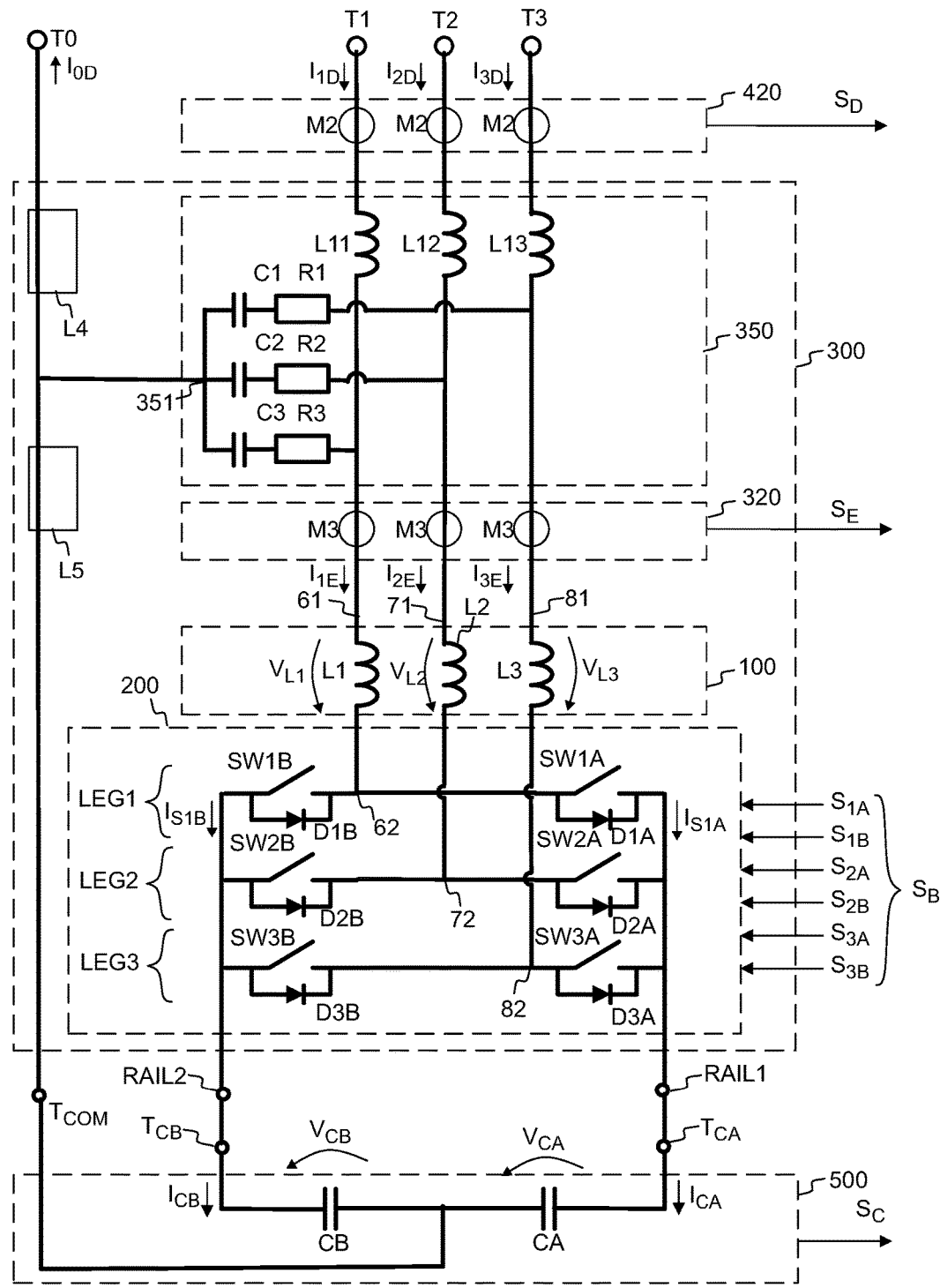
FIG. 5 shows a circuit diagram of a rectifier-inverter unit connected to an energy storage unit.

The power conditioning device 600 may comprise an energy storage unit 500 and a rectifier-inverter unit 300. The rectifier-inverter unit 300 may, in turn, comprise a switch bridge 200 and an inductor unit 100 (FIG. 5). The rectifier-inverter unit 300 may be arranged to generate the compensating currents $I_{1D}$, $I_{2D}$, $I_{3D}$ by transferring electrical energy from the output nodes T1, T2, T3 to the energy storage unit 500, and to transfer electrical energy back from the energy storage unit 500 to the output nodes T1, T2, T3. The compensating currents $I_{1D}$, $I_{2D}$, $I_{3D}$ may be generated by transferring energy in a synchronized manner from the output nodes T1, T2, T3 to the energy storage unit 500, and back from the energy storage unit 500 to the output nodes T1, T2, T3.

The rectifier-inverter unit 300 may be arranged to transfer electrical energy from the output node T1 of the first phase PH1 to the energy storage unit 500, and to transfer electrical energy from the energy storage unit 500 to the output node T2 of the second phase PH2. For example, when compensating phase imbalance, the frequency of transferring energy from the first node T1 to the energy storage unit 500, and transferring energy from the energy storage unit 500 to the second node T2 may be substantially equal to the fundamental frequency $f_0$ of the supply 700. The fundamental frequency $f_0$ of the supply 700 may be e.g. 50 Hz or 60 Hz. The rectifier-inverter unit 300 may be arranged to transfer electrical energy from the output nodes T0, T1 to the energy storage unit 500, and to transfer electrical energy from the energy storage unit 500 to the output nodes T0, T2.

The input node IN1 may have a voltage $V_1$, the input node IN2 may have a voltage $V_2$, and the input node IN3 may have a voltage $V_3$. The voltages $V_1$, $V_2$, and $V_3$ may be defined e.g. with respect to the voltage V0 of the neutral phase PH0. During normal operation, the voltages $V_1$, $V_2$, and $V_3$ may be substantially sinusoidal, wherein the phase difference between the voltages $V_1$ and $V_2$ may be substantially equal to 120°, and the phase difference between the voltages $V_1$ and $V_3$ may be substantially equal to 240°. The voltage $V_{1T}$ may denote the voltage of the output node T1 of the first phase PH1 with respect to the voltage $V_{0T}$ of the output node T0 of the neutral phase PH0 (star configuration). The voltage $V_{2T}$ may denote the voltage of the output node T2 with respect to the voltage $V_{0T}$. The voltage $V_{3T}$ may denote the voltage of the node T3 with respect to the voltage $V_{0T}$. The voltage $V_{0T}$ of the output node T0 of the neutral phase PH0 may be substantially equal to zero.

The power conditioning unit 600 may comprise a voltage sensor unit 460, which may be arranged to monitor the voltages $V_1$, $V_2$, $V_3$ of the input nodes IN1, IN2, IN3. The power conditioning unit 600 may comprise a voltage sensor unit 415, which may be arranged to monitor voltages $V_{1T}$, $V_{2T}$, $V_{3T}$ of the output nodes T1, T2, T3. The power conditioning unit 600 may comprise a current sensor unit 410, which may be arranged to monitor the load currents $I_{0L}$, $I_{1L}$, $I_{2L}$, $I_{3L}$ and/or the input currents $I_{0T}$, $I_{1T}$, $I_{2T}$, $I_{3T}$. The power conditioning unit 600 may comprise a current sensor unit 420, which may be arranged to monitor the compensating currents $I_{0D}$, $I_{1D}$, $I_{2D}$, $I_{3D}$.

The power conditioning device 600 may comprise a switch unit 470, which is arranged to disconnect the load 800 from the supply 700 when one or more input nodes IN1, IN2, IN3 have an abnormal voltage $V_1$, $V_2$, $V_3$. The switch unit 470 may be arranged to connect the load 800 to the supply 700 when each input node IN1, IN2, IN3 has the normal voltage $V_1$, $V_2$, $V_3$, again. The switch unit 470 may comprise switches SWM1, SWM2, SWM3. The first switch SWM1 may be arranged to disconnect the input node IN1 of the first phase PH1 from the output node T1. The second switch SWM2 may be arranged to disconnect the input node IN2 of the second phase PH2 from the output node T2. The third switch SWM3 may be arranged to disconnect the input node IN3 of the third phase PH3 from the output node T3. The switches SWM1, SWM2, SWM3 may be controlled by a control signal $S_{SWM}$. The control signal $S_{SWM}$ may be provided by a control unit 400.

An abnormal situation at the input nodes IN1, IN2, IN3 may be classified to be e.g. voltage sag, an overvoltage event, or substantial deviation from nominal fundamental frequency $f_0$.

The power conditioning device 600 may have a first operating mode MODE1 and a second operating mode MODE2. The first operating mode MODE1 may be called e.g. as a normal operating mode, and the second operating mode MODE2 may be called e.g. as a reserve power mode. In the normal mode MODE1, the input nodes IN1, IN2, IN3 may be connected to the output nodes T1, T2, T3 so that the energy carried by the input currents $I_{1T}$, $I_{2T}$, $I_{3T}$ during a fundamental period $T_0$ ($=1/f_0$) may be substantially equal to the energy carried by the load currents $I_{1L}$, $I_{2L}$, $I_{3L}$ during said fundamental period $T_0$. $f_0$ denotes the nominal fundamental frequency of the supply 800. For example, $T_0$=16.7 ms or $T_0$=20 ms). The first switch SWM1 may be arranged to connect the output node T1 to the input node IN1 in the normal mode MODE1. The second switch SWM2 may be arranged to connect the output node T2 to the input node IN2 in the normal mode MODE1. The third switch SWM3 may be arranged to connect the output node T3 to the input node IN3 in the normal mode MODE1.

In the reserve power mode MODE2, substantially all energy consumed by the load 800 may be temporarily provided from the energy storage unit 500 such that the supply 700 is disconnected from the output nodes T1, T2, T3. In the reserve power mode MODE2, the device 600 may provide three-phase alternating voltages to the nodes T1, T2, T3. In the reserve power mode MODE2, the device 600 may provide three-phase alternating currents to the nodes T1, T2, T3 in order to ensure operation of the load 800.

The control unit 400 may be configured to monitor the voltages $V_1$, $V_2$, $V_3$ of the input nodes IN1, IN2, IN3, e.g. by receiving a signal $S_{VIN}$ from the voltage sensor unit 460. The power conditioning device 600 may comprise a monitoring input 401 for receiving a monitoring signal $S_{VIN}$ from the voltage sensor unit 460. The signal $S_{VIN}$ may be indicative of the voltages $V_1$, $V_2$, $V_3$ at the input nodes IN1, IN2, IN3. The power conditioning device 600 may comprise a control output 402 for providing a control signal $S_{SWM}$ to the switch unit 470. In particular, the control unit 400 may comprise the monitoring input 401 and/or the control output 402.

The control unit 400 may be configured to enable operation in the reserve power mode MODE2 e.g. when the voltage $V_1$, $V_2$, $V_3$ of one or more input nodes is substantially lower than a sinusoidal reference voltage.

The voltage $V_1$, $V_2$, $V_3$ may contain one or more noise components also in normal operation. The noise components are superposed to the sinusoidal fundamental component. The presence of the noise components may make it more difficult to detect an abnormal voltage situation. Disconnecting the load 800 rapidly from the input nodes T1, T2, T3 may cause additional electrical disturbances. The criterion for detecting an abnormal voltage situation may be selected such that the presence of typical noise components is not likely to trigger operation in the reserve power mode MODE2, in order to avoid generating said additional disturbances. One way to provide improved tolerance against noise is to detect the abnormal voltage situation based on temporally averaged voltages $V_1$, $V_2$, $V_3$. The control unit 400 may be configured to enable operation in the reserve power mode MODE2 e.g. when temporally averaged voltage deviation exceeds a threshold value.

Temporally averaged voltage deviation DV1 may be determined for the first phase PH1 e.g. as follows:

$$DV1(t) = \frac{1}{W1} \cdot \int_{t-W1}^{t} (V_{1,REF}(t') - V_1(t'))dt' \quad (1)$$

where $DV1(t)$ denotes the integrated voltage deviation DV1 (t) at the time t, t denotes real time, W1 denotes the length of the integration period, $V_1(t')$ denotes the instantaneous measured voltage $V_1$ of the first phase PH1 at a time t', $V_{1,REF}(t)$ denotes the instantaneous value of a sinusoidal reference voltage for the first phase PH1 at the time t'.

The fundamental frequency $f_0$ of the network may be e.g. 50 Hz or 60 Hz, and the corresponding fundamental period $T_0$ (=$1/f_0$) may be e.g. 20 ms or 16.7 ms. The length W1 of the integration period may be e.g. in the range of 1% to 50% of the fundamental period $T_0$, advantageously in the range of 5% to 20% of the fundamental period $T_0$.

For example, the control unit 400 may be configured to enable operation in the reserve power mode MODE2 when the temporally averaged voltage deviation DV1 exceeds a threshold value THR1:

$$|DV1(t)| > THR1 \quad (2)$$

The power conditioning device 600 may be arranged to disconnect the output nodes T1, T2, T3 from the input nodes IN1, IN2, IN3 when at least one of the input nodes T1, T2, T3 has an abnormal voltage. When the abnormal situation is detected, the control unit 400 may be configured to send a control signal $S_{SWM}$ via the control output 402 to the switch unit 470. The switch unit 470 may be arranged to disconnect the input nodes IN1, IN2, IN3 from the output nodes T1, T2, T3 according to the control signal $S_{SWM}$. The switches SWM1, SWM2, SWM3 of the switch unit 470 may be implemented e.g. by semiconductor switches, in particular by using thyristors and/or transistors. In an embodiment, the switches SWM1, SWM2, SWM3 may be arranged to disconnect the all input nodes IN1, IN2, IN3 from the output nodes T1, T2, T3.

The power conditioning device 600 may comprise a memory MEM1 for storing operating parameters PAR1. The power conditioning device 600 may comprise a memory MEM2 for storing computer program PRG1. The program PRG1, when executed by one or more data processors (e.g. by the control unit 400) may control operation of the device 600 in the normal operating mode MODE1 and/or in the reserve power mode MODE2. The parameters PAR1 may e.g. specify e.g. a threshold value THR1 for detecting a voltage sag situation.

The power conditioning device 600 may optionally comprise a user interface 450 e.g. for selecting operating parameters of the device 600. The interface 450 may comprise e.g. a display and a keypad (not shown). The interface 450 may be optionally removed e.g. after the parameters PAR1 have been defined by a user. In an embodiment, the control unit 400 may automatically select optimum parameters PAR1, and the user interface 450 is not needed.

The energy distribution system 900 may comprise the input nodes IN0, IN1, IN2, IN3, the output nodes T0, T1, T2, T3, the conductors CBL0, CBL1, and the switch unit 470. The power conditioning device 600 may comprise the rectifier-inverter unit 300, the control unit 400, and the memory units MEM1, MEM2. The power conditioning device 600 may further comprise the energy storage unit 500. The power conditioning device 600 may further comprise one or more of the monitoring units 410, 415, 420, 460. The power conditioning device 600 may further comprise the switch unit 470, i.e. a switch unit 470 of a power conditioning device 600 may be arranged to operate as a part of the energy distribution system 900. The power conditioning device 600 may further comprise the input nodes IN0, IN1, IN2, IN3, the output nodes T0, T1, T2, T3, and the conductors CBL0, CBL1. In other words, nodes IN1, IN2, IN3, T0, T1, T2, T3 of a power conditioning device 600 may be arranged to operate as a part of the energy distribution system 900. The energy distribution system 900 may comprise the power conditioning device 600, i.e. the power conditioning device 600 may be arranged to operate as a part of an energy distribution system 900. Regarding transfer of energy, the network 900 may comprise the power conditioning device 600 so that the energy storage unit 500 is not considered to be a part of the network 900.

Figure 2:
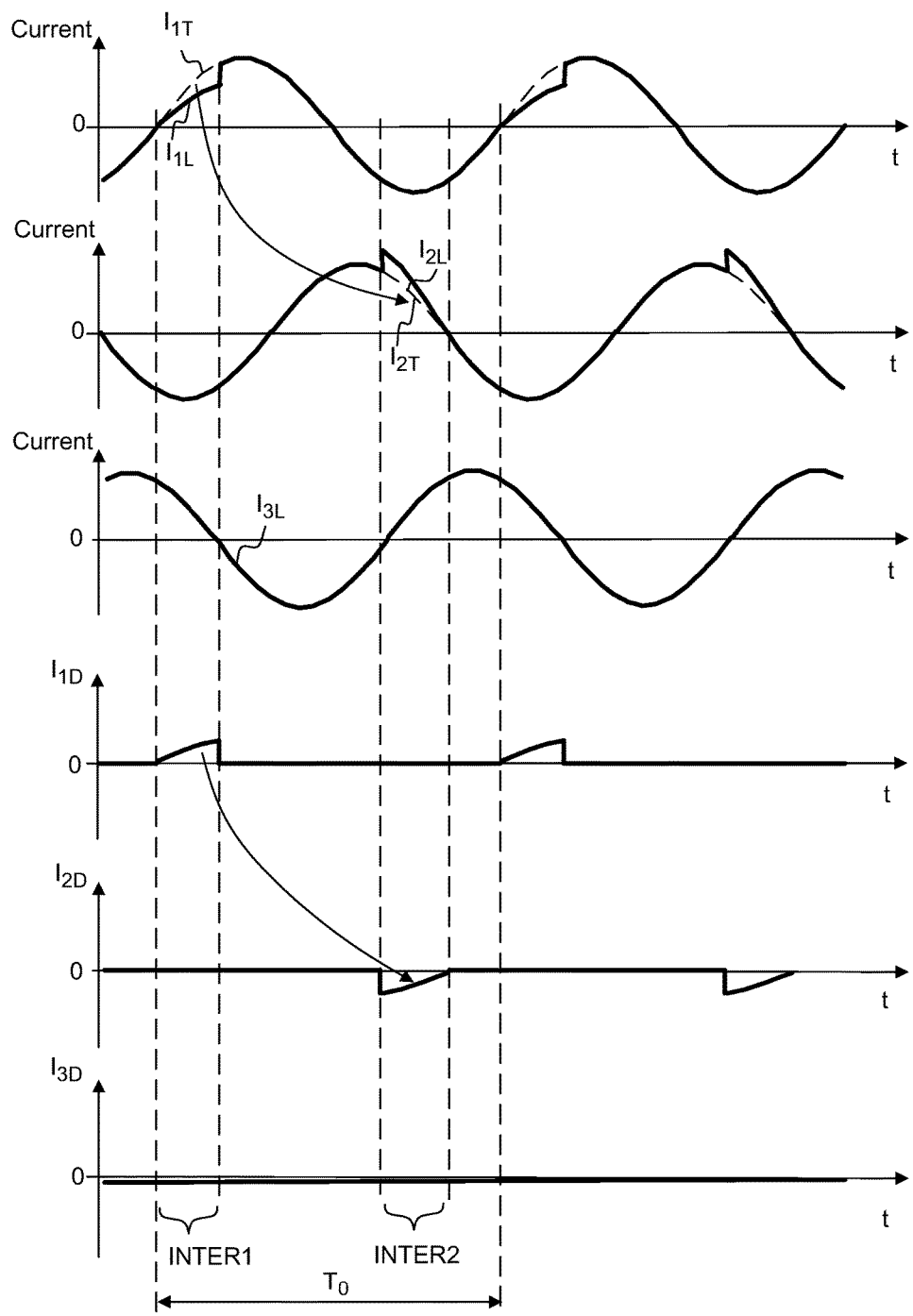
FIG. 2 shows, by way of example, compensating distorted current waveforms, by transferring energy from a first phase to a second phase.

FIG. 2 shows compensating waveform distortion and phase imbalance by adding the compensating currents $I_{1D}$, $I_{2D}$ to the load currents $I_{1L}$, $I_{2L}$. The power conditioning device 600 may be arranged to determine and generate compensating currents $I_{1D}$, $I_{2D}$, $I_{3D}$, and to couple the compensating currents $I_{1D}$, $I_{2D}$, $I_{3D}$ to the output nodes T1, T2, T3 in order to draw substantially pure and/or balanced sine wave currents $I_{1T}$, $I_{2T}$, $I_{3T}$ from the input nodes IN1, IN2, IN3.

The waveform distortion shown in FIG. 2 may be caused e.g. when the load currents $I_{1L}$ and $I_{2L}$ are controlled by a thyristor controller (the load 800 may comprise the thyristor controller). The solid curve $I_{1L}$ shows a distorted load current of the first phase PH1, the dashed curve $I_{1T}$ shows a desired input current of the first phase PH1, and the solid curve $I_{1D}$ shows a compensating current which may be added to the load current $I_{1L}$ in order to provide the desired input current $I_{1T}$. The solid curve $I_{2L}$ shows a distorted load current of the second phase PH2, the dashed curve $I_{2T}$ shows a desired input current of the second phase PH2, and the solid curve $I_{2D}$ shows a compensating current which may be added to the load current $I_{2L}$ in order to provide the desired input current $I_{2T}$. The curve $I_{3L}$ shows a substantially sinusoidal load current of the third phase PH3. The curve $I_{3D}$ shows a substantially zero compensating current.

The power conditioning device 600 may be arranged to generate the compensating current $I_{1D}$ so as to compensate waveform distortion of the load current $I_{1L}$. The power conditioning device 600 may be arranged to generate the compensating current $I_{1D}$ based on the measured load current $I_{1L}$ such that the input current $I_{1T}$ resulting as the sum of the load current $I_{1L}$ and the compensating current $I_{1D}$ has a substantially sinusoidal waveform. The power conditioning device 600 may be arranged to generate the compensating current $I_{2D}$ in order to compensate waveform distortion of the load current $I_{2L}$. The power conditioning device 600 may be arranged to generate the compensating current $I_{2D}$ based on the measured load current $I_{2L}$ such that the input current $I_{2T}$ resulting as the sum of the load current $I_{2L}$ and the compensating current $I_{2D}$ has a substantially sinusoidal waveform. When compensating phase imbalance, the power conditioning device 600 may be arranged to generate the compensating currents $I_{1D}$ and $I_{2D}$ such that the RMS value of the input current $I_{1T}$ is substantially equal to the RMS value of the input current $I_{2T}$.

During a first time period INTER1, the power consumed by the load 800 may be lower than the power supplied via the input nodes IN1, IN2, IN3. During a second time period INTER1, the power consumed by the load 800 may temporarily exceed the power supplied via the input nodes IN1, IN2, IN3. During the first time period INTER1, energy may be transferred from the node T1 to the energy storage unit 500. During the second time period INTER2, energy may be transferred from the energy storage unit 500 to the node T2 in order to compensate waveform distortion and/or phase imbalance.

The RMS value denotes the root mean square, i.e. the square root of the average of the squares of the instantaneous values over the fundamental time period $T_0$.

The active power $P_1$ transferred to the load 800 via the first phase PH1 during a fundamental period $T_0$ may be defined e.g. by the following equation:

$$P_1 = \int_0^{T_0} V_{1T}(t) I_{1L}(t) dt \quad (3a)$$

where $V_{1T}(t)$ denotes the instantaneous voltage of the output node T1 with respect to the node T0 of the neutral phase, $I_{1L}(t)$ denotes the instantaneous current drawn from the output nodes T1 to the load 800, and t denotes time.

The RMS value $V_{RMS1}$ of the voltage $V_{1T}(t)$ of the output node T1 may be calculated e.g. by the following equation:

$$V_{V_{RMS1}} = \frac{1}{T_0} \int_0^{T_0} V_{1T}^2(t) dt \quad (3b)$$

The instantaneous active current component $I_{1p}(t)$ of the load current $I_{1L}(t)$ may defined e.g. by the following equation:

$$I_{1p}(t) = \frac{P_1}{(V_{RMS1})^2} V_P(t) \quad (3c)$$

The instantaneous voltage $V_P(t)$ is a reference voltage, which may be selected depending on compensation objectives. In particular, the instantaneous voltage $V_P(t)$ may be equal to the instantaneous voltage $V_{1T}(t)$ of the output node T1. Thus, the instantaneous active current component $I_{1D}(t)$ of the load current $I_{1L}(t)$ may defined e.g. by the following equation:

$$I_{1p}(t) = \frac{P_1}{(V_{RMS1})^2} V_{1T}(t) \quad (3d)$$

The instantaneous non-active current component $I_{1q}(t)$ of the load current $I_{1L}(t)$ may be defined e.g. by the following equation:

$$I_{1q}(t) = I_{1L}(t) - I_{1p}(t) \quad (3e)$$

In other words, the non-active current component may be obtained by subtracting the active current component from the load current.

In an embodiment, the instantaneous voltage $V_P(t)$ of equation (3c) may also be equal to the fundamental component of the voltage $V_{1T}(t)$. The peak value of the sinusoidal fundamental component is equal to $\sqrt{2} \cdot V_{RMS1}$. In this case, the instantaneous active current component $I_{1p}(t)$ of the load current $I_{1L}(t)$ may defined e.g. by the following equation:

$$I_{1p}(t) = \frac{P_1}{(V_{RMS1})^2} \sqrt{2} \, V_{RMS1} \sin(2\pi f_0 t + \varphi) \quad (3f)$$

where the phase angle $\phi$ may be selected such that the phase difference between the voltage $V_{1T}(t)$ and the sinusoidal fundamental component is substantially equal to zero. Also in this case, the instantaneous non-active current component $I_{1q}(t)$ of the load current $I_{1L}(t)$ may be defined by the equation (3e).

The non-active current $I_{1q}(t)$ may be substantially equal to zero during the fundamental period $T_0$ e.g. if the load current $I_{1L}(t)$ consists of a sinusoidal component at the fundamental frequency $f_0$, and if the phase difference between the voltage $V_{1T}(t)$ and the load current $I_{1L}(t)$ is substantially equal to zero.

The load current $I_{1L}(t)$ may comprise e.g. one or more harmonic current components at frequencies, which are higher than the fundamental frequency $f_0$. The load current $I_{1L}(t)$ may comprise e.g. one or more current components which have a non-zero phase difference with respect to the voltage $V_{1T}(t)$. The load current $I_{1L}(t)$ may comprise a non-active current component $I_{1q}(t)$ e.g. when the load current $I_{1L}(t)$ has one or more harmonic current components at frequencies, which are higher than the fundamental frequency $f_0$. The load current $I_{1L}(t)$ may comprise a non-active current component $I_{1q}(t)$ e.g. when the load current $I_{1L}(t)$ has one or more current components which have a non-zero phase difference with respect to the voltage $V_{1T}(t)$.

The non-active current component $I_{1q}(t)$ may be considered to represent a non-ideal part of the current waveform. The non-active current component $I_{1q}(t)$ may be considered to represent ineffective transfer of power. The non-active current components may cause increased line current and losses, greater power generation requirement for the supply 700, and other harmful effects in the network 900. The losses may be reduced by compensating the non-active current component $I_{1q}(t)$.

Also the load current $I_{2L}$ of the second phase PH2 may have a non-active current component $I_{2q}(t)$, which may be compensated in order to increase the efficiency of the network 900. Also the load current $I_{3L}$ of the third phase PH3 may have a non-active current component $I_{3q}(t)$, which may be compensated to increase the efficiency of the network 900. For example, a non-linear load 800 may give rise to one or more non-active current components $I_{1q}(t)$, $I_{2q}(t)$, $I_{3q}(t)$.

Figure 3A:
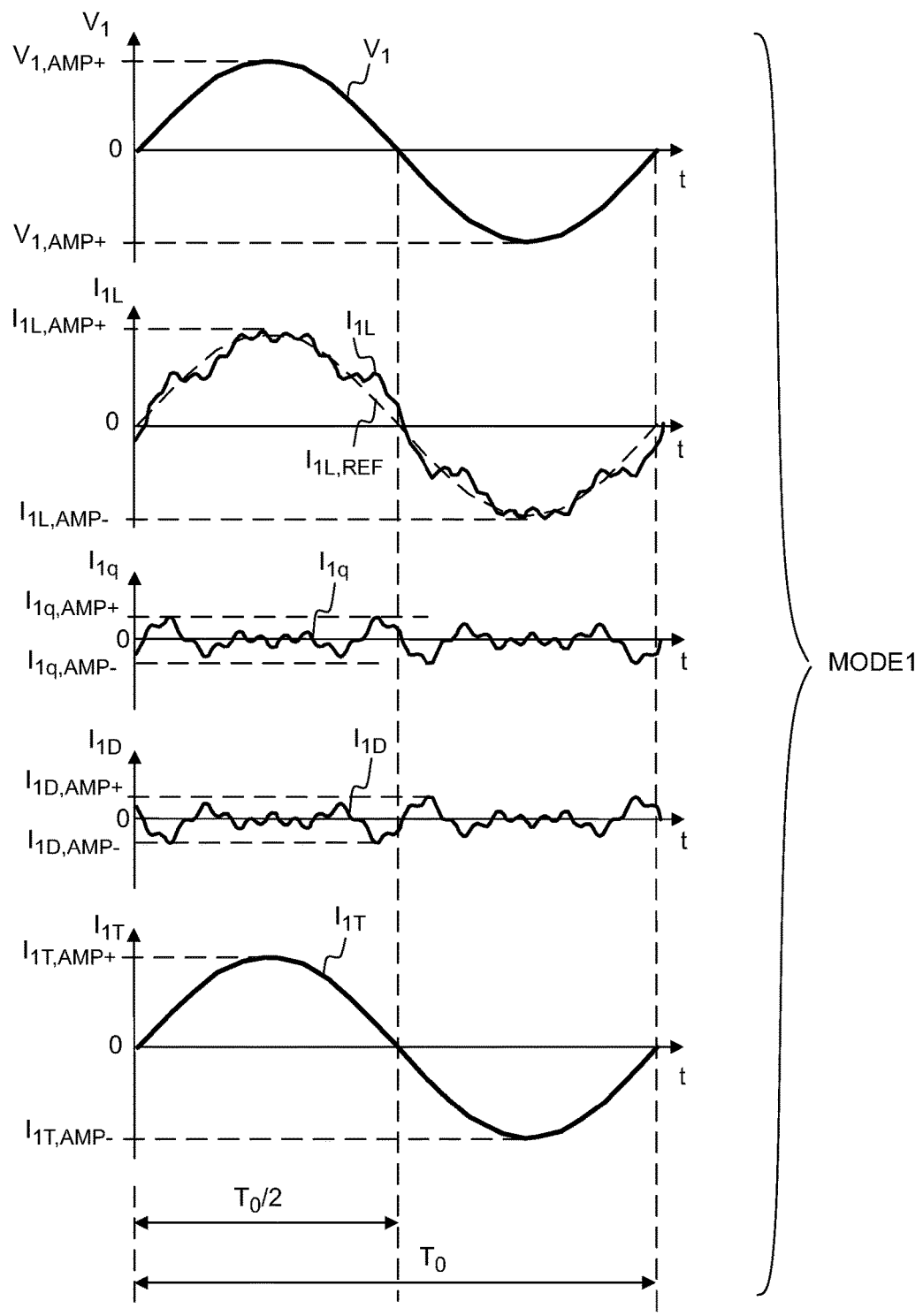
FIG. 3a shows, by way of example, compensating non-active current components during normal operation.

FIG. 3a shows, by way of example, current and voltage waveforms in the normal operating mode MODE1. The uppermost curve shows a substantially sinusoidal input voltage V1. The voltage $V_{1T}$ of the output node T1 may be substantially equal to the voltage V1 of the input node IN1 when the output node T1 is connected to the input node IN1 by the switch SWM1.

The second curve from the top shows a distorted load current $I_{1L}$, and a substantially sinusoidal reference current $I_{1L,REF}$. The phase difference between the reference current $I_{1L,REF}$ and the input voltage $V_1$ may be substantially equal to zero.

The third curve from the top shows a non-active current component $I_{1q}$ of the distorted load current $I_{1L}$. The instantaneous values $I_{1q}(t)$ non-active current component $I_{1q}$ may be determined e.g. by subtracting the instantaneous values $I_{1L,REF}(t)$ of the reference current $I_{1L,REF}$ from the instantaneous values $I_{1L}(t)$ of the load current $I_{1L}$. The device 600 may comprise e.g. a numerical function generator for generating values of the reference current $I_{1L,REF}$.

The fourth curve from the top shows a compensating current $I_{1D}$, which may be provided in order to compensate the non-active current component $I_{1q}$. In particular, the power conditioning device 600 may be arranged to generate a compensating current $I_{1D}$ which is substantially equal to the non-active current component $I_{1q}$ multiplied by a coefficient −1. In other words, the sum of the currents $I_{1D}$ and $I_{1q}$ may be substantially equal to zero. The generated compensating current $I_{1D}$ may be coupled to the output node T1 in order to compensate the non-active current component $I_{1q}$.

The lowermost curve of FIG. 3a shows the input current $I_{1T}$ of the first phase PH1. Thanks the compensating current $I_{1D}$, the input current $I_{1T}$ drawn from the input node IN1 may be substantially sinusoidal even when the load current $I_{1L}$ is distorted. The input current $I_{1T}$ may be formed as a sum of the load current $I_{1L}$ and the compensating current $I_{1D}$. The input current $I_{1T}$ may be formed as a combination of the load current $I_{1L}$ and the compensating current $I_{1D}$.

The symbols $V_{1,AMP+}$, $V_{1,AMP-}$, $I_{1L,AMP+}$, $I_{1L,AMP-}$, $I_{1q,AMP+}$, $I_{1q,AMP-}$, $I_{1D,AMP+}$, $I_{1D,AMP-}$, $I_{1T,AMP+}$, $I_{1T,AMP-}$ indicate the peak values of the voltages and the currents.

The waveforms of the compensating currents $I_{1D}$, $I_{2D}$, $I_{3D}$ may be determined based on the measured load currents $I_{1L}$, $I_{2L}$, $I_{3L}$ even when the waveforms of the load currents are arbitrary. A compensating current $I_{2D}$ for the second phase PH2 may be determined e.g. by subtracting a sinusoidal reference current $I_{2L,REF}(t)$ from the load current $I_{2L}(t)$. A compensating current $I_{3D}$ for the third phase PH3 may be determined e.g. by subtracting a sinusoidal reference current $I_{3L,REF}(t)$ from the load current $I_{3L}(t)$.

The reference current $I_{1L,REF}$ may be a target current or a "desired" current, which should be drawn from the network in an "optimum situation. The reference current $I_{1L,REF}$ may be e.g. a substantially sinusoidal current. The reference current $I_{1L,REF}$ may be selected such that the non-active current component $I_{1q}(t)$ of the load current $I_{1L}$ may be compensated. Compensating may refer to partial compensation (substantially less than 100% compensation) and/or to full compensation (100% compensation). The reference current $I_{1L,REF}$ may be selected such that phase imbalance is compensated. The reference current $I_{1L,REF}$ may also be selected such that a reactive load current is compensated. Reference currents $I_{2L,REF}$, $I_{3L,REF}$ for the other phases PH2, PH3 may be determined and used, respectively.

The "optimum situation" depends on the application. In different operating modes, the power conditioning device 600 may be set to correct phase imbalance, suppress predetermined harmonic noise components, suppress all harmonic (overtone) components, and/or compensate reactive power. An attempt to simultaneously correct all these non-idealities may often lead to an over-rated system, where the inductors, capacitors and transistors would be very large. In certain applications, it is not necessary to correct all these non-idealities.

The term "harmonic current component" refers to a spectral component of a current waveform, whose frequency $f_m$ is equal to an integer multiple of the fundamental mains frequency $f_0$ of the network, i.e. $f_m = m \cdot f_0$, where m is an integer. The fundamental mains frequency $f_0$ is typically equal to 50 Hz or 60 Hz.

The device 600 may be arranged to suppress one or more harmonic current components selected from a group consisting of current components whose frequency $f_m$ is in the range of $2 \cdot f_0$ to $25 \cdot f_0$. The attenuation of each component may be individually selectable. The attenuation of a current component may be in the range of 0 to 100%.

In addition to the harmonic current components individually selected from the range of $2 \cdot f_0$ to $25 \cdot f_0$, the device 600 may be arranged to suppress all harmonic current components whose frequency $f_m$ is in the range of $26 \cdot f_0$ to $50 \cdot f_0$. The maximum frequency component of a compensating current $I_{1D}$, which can be generated by the device 600 depends on the switching frequency $f_{MOD}$ and on the properties of the low pass filter 350 (see FIG. 5).

The device 600 may be arranged to suppress one or more harmonic current components selected from a group consisting of current components whose frequency $f_m$ is in the range of $2 \cdot f_0$ to $50 \cdot f_0$.

When compensating phase imbalance, the power conditioning device 600 may be arranged to operate such that the fundamental component of the input current $I_{1T}$ is amplified, and such that the fundamental component of the input current $I_{2T}$ is suppressed. The fundamental component refers to the harmonic current component having the frequency $f_0$.

The switch bridge 200 and the inductor unit 100 of the device 600 (FIG. 5) may be arranged to generate the compensating current $I_{1D}$ in the normal operating mode MODE1 by transferring energy from the network 900 to an energy storage unit 500, and by transferring energy from the energy storage unit 500 back to the network 900. In particular, the switch bridge 200 and an inductor unit 100 may generate the compensating current $I_{1D}$ by transferring energy from the nodes T0, T1, T2, T3 of the network 900 and by transferring energy to the nodes T0, T1, T2, T3. The amount of energy transferred from the energy storage unit 500 to the network 900 during a fundamental period $T_0$ may be e.g. greater than 90% of the amount of energy transferred from the network 900 to the energy storage unit 500 during said fundamental period $T_0$. The amount of energy transferred from the nodes T0, T1, T2, T3 to the energy storage unit 500 during said fundamental period T0 may be e.g. in the range of 0.1% to 90% of the energy transferred from the input nodes IN1, IN2, IN3 to the nodes T1, T2, T3 during said fundamental period $T_0$.

Figure 3B:
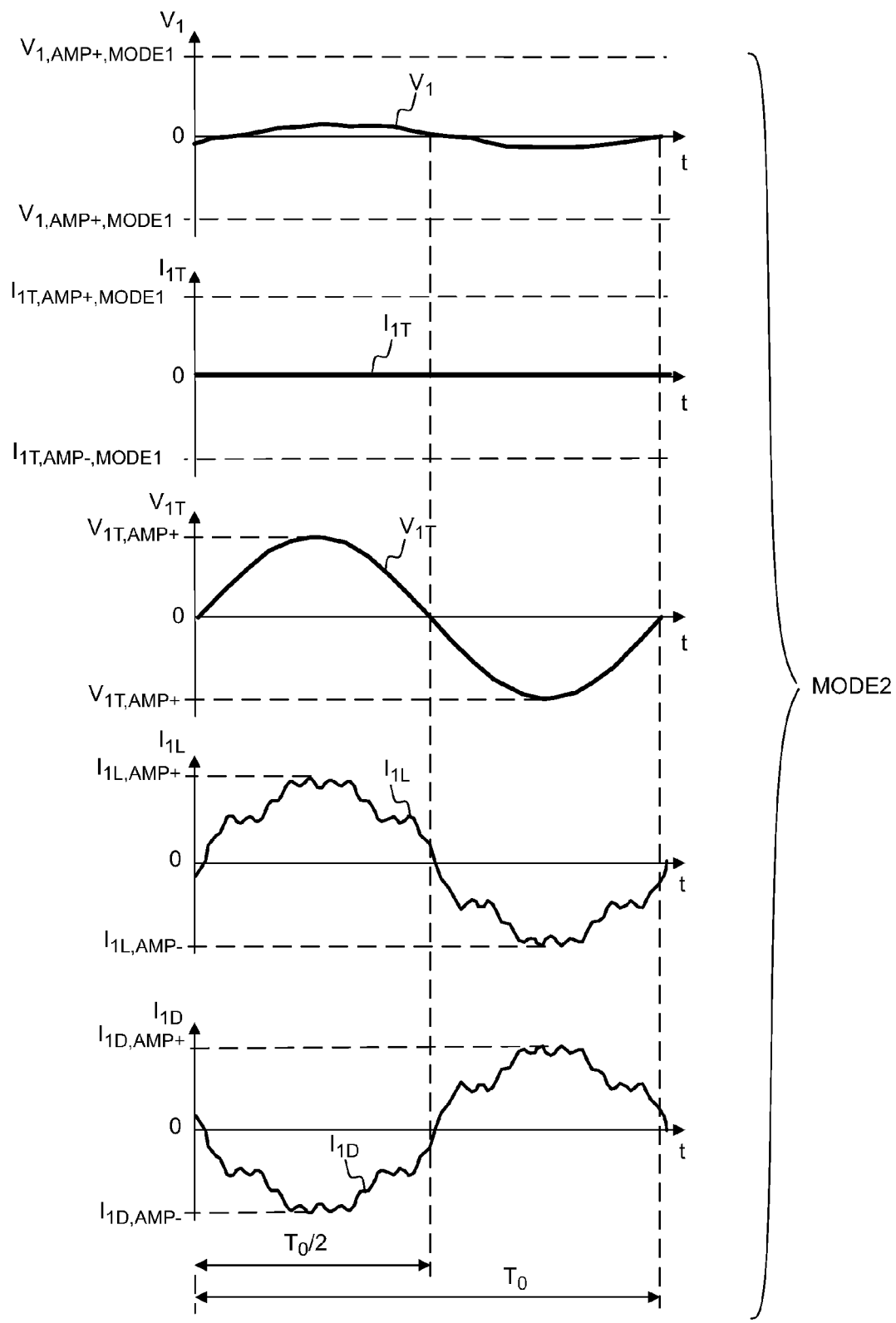
FIG. 3b shows, by way of example, providing compensating currents during a voltage sag situation.

FIG. 3b shows, by way of example, current and voltage waveforms in the reserve power mode MODE2. Referring to the uppermost curve of FIG. 3b, the voltage $V_1$ of the input node IN1 may be substantially lower than in the normal situation. $V_{1,AMP+,MODE1}$ and $V_{1,AMP+,MODE1}$ indicate the peak values of the voltage $V_1$ in the normal situation. The voltage $V_1$ may comprise noise and it may have an abnormal frequency. The voltage $V_1$ may also be substantially equal to zero.

Referring to the second curve from the top in FIG. 3b, the input current $I_{1T}$ drawn from the input node IN1 may be substantially equal to zero. In this case, the output node T1 is disconnected from the input node IN1 by the switch SWM1. $I_{1T,AMP+,MODE1}$ and $I_{1T,AMP+,MODE1}$ indicate the peak values of the voltage input current in the normal situation.

Referring to the third curve from the top in FIG. 3b, the device 600 may be arranged to generate the compensating currents $I_{1D}$, $I_{2D}$, $I_{3D}$ such that the voltages $V_{1T}$, $V_{2T}$, $V_{3T}$ of the output nodes T1, T2, T3 may be substantially sinusoidal. $V_{1T,AMP+}$, $V_{1T,AMP+}$ denote the peak values of the voltage $V_{1T}$.

The fourth curve from the top in FIG. 3b shows, by way of example, a load current $I_{1L}$ drawn by the load 800 from the output node T1. The load current $I_{1L}$ may have e.g. a distorted waveform.

Referring to the lowermost curve of FIG. 3b, the device 600 may be arranged to operate such that the compensating current $I_{1D}$ coupled to the output node T1 is substantially equal to the current $I_{1L}$ multiplied by a coefficient −1. In other words, the sum of the currents $I_{1D}$ and $I_{1L}$ may be substantially equal to zero. Consequently, the load may continue operation even when no energy is transferred from the supply 700 to the load 800.

The switch bridge 200 and an inductor unit 100 of the device 600 may be arranged to generate the compensating current $I_{1D}$ in the normal operating mode MODE1. Said switch bridge 200 and said inductor unit 100 may be arranged to generate the compensating current $I_{1D}$ also in the reserve power mode MODE2. However, the compensating current $I_{1D}$ generated during the reserve power mode MODE2 may have substantially different waveform when compared with the compensating current $I_{1D}$ generated during the normal operating mode MODE1. The compensating current $I_{1D}$ generated during the reserve power mode MODE2 may be called e.g. as an auxiliary current $I_{1D}$, in order to emphasize said difference. A second compensating current $I_{2D}$ generated during the reserve power mode MODE2 may be called e.g. as a second auxiliary current $I_{2D}$. A third compensating current $I_{3D}$ generated during the reserve power mode MODE2 may be called e.g. as a third auxiliary current $I_{3D}$.

Figure 4:
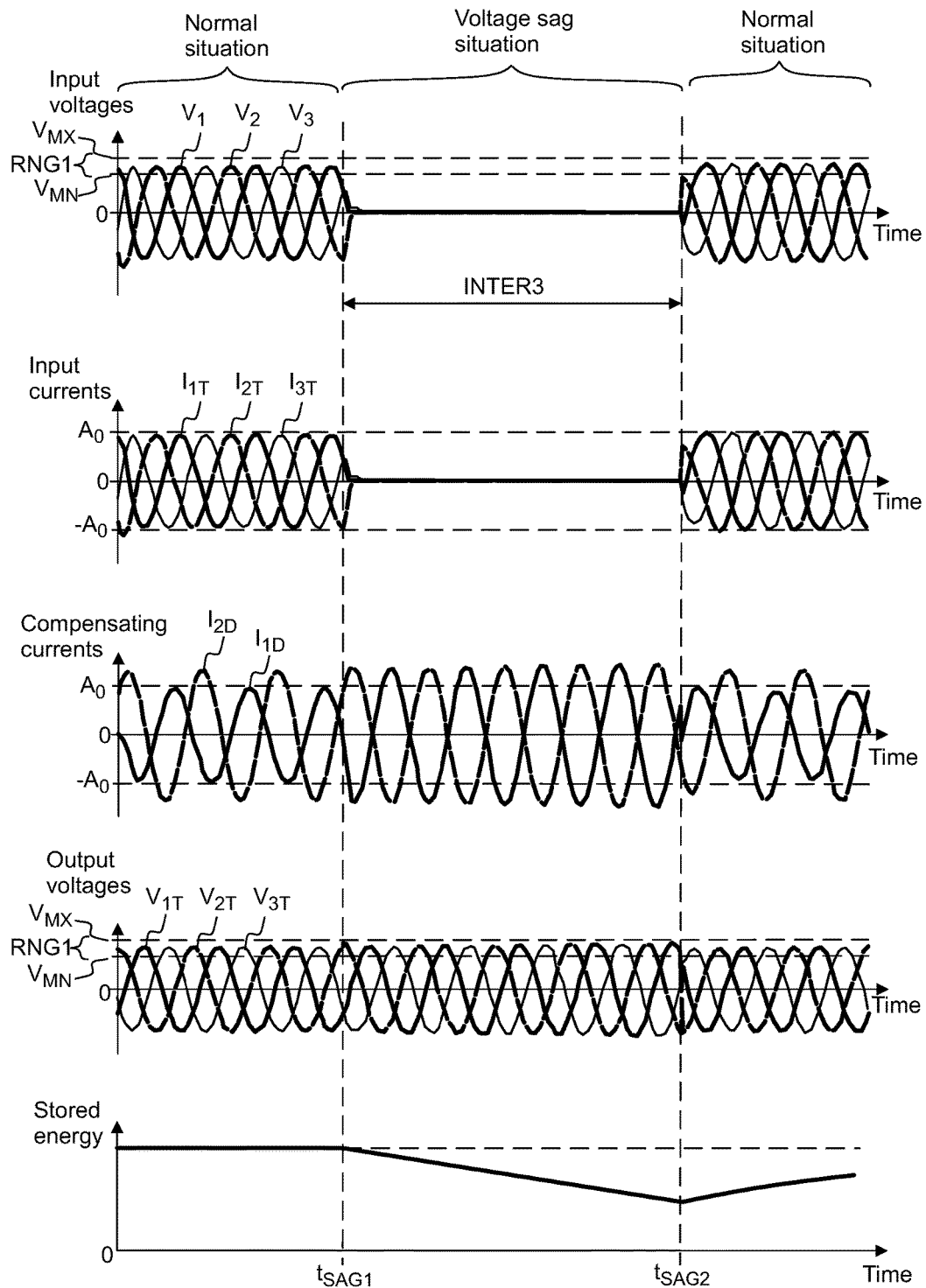
FIG. 4 shows, by way of example, providing compensating currents during a voltage sag situation.

Referring to FIG. 4, the power conditioning device 600 may be arranged to disconnect the load 800 from the supply 700 at a time $t_{SAG1}$, e.g. when analysis of the input voltages $V_1$, $V_2$, $V_3$ indicates an abnormal situation. The abnormal situation may be e.g. voltage sag, overvoltage, or abnormal frequency. Said disconnecting may e.g.:
  facilitate restoring the normal state of the supply 700 by reducing the load,
  protect the load 800 during the abnormal situation, and/or
  ensure normal operation of the load 800 during the abnormal situation.

The load 800 may be connected to the supply 700 again at the time $t_{SAG2}$, provided that the instantaneous input voltages $V_1$, $V_2$, $V_3$ are normal again. INTER3 denotes a reserve time period between the times $t_{SAG1}$ and $t_{SAG2}$. The length of the reserve time period INTER3 may be e.g. in the range of 0.02 s to 100 s. The maximum length of the reserve time period INTER3 may depend on the magnitude of the load currents and on the amount of energy stored in the energy storage unit 500.

The power conditioning device 600 may be arranged to operate as a reserve power supply during the abnormal situation. The power conditioning device 600 may be arranged to operate as a reserve power supply during the time period INTER3. The power conditioning device 600 may provide the required load currents $I_{1L}$, $I_{2L}$, $I_{3L}$ during the reserve time period INTER3 by transferring energy from the energy storage unit 500 to one or more output nodes T1, T2, T3. The compensating currents $I_{1D}$, $I_{2D}$, $I_{3D}$ may be generated such that the output nodes T1, T2, T3 may have substantially sinusoidal voltages also during the reserve time period INTER3.

During the reserve time period INTER3, the magnitude of each load current $I_{0L}$, $I_{1L}$, $I_{2L}$, $I_{3L}$ may be equal to the magnitude of the respective compensating current $I_{0D}$, $I_{1D}$, $I_{2D}$, $I_{3D}$. In other words, $I_{1L}$ may be equal to $-I_{1D}$ such that the input current $I_{1T}$ may be substantially equal to zero. $I_{2L}$ may be equal to $-I_{2D}$ such that the input current $I_{2T}$ may be substantially equal to zero. $I_{3L}$ may be equal to $-I_{3D}$ such that the input current $I_{3T}$ may be substantially equal to zero.

The amount of energy stored in the energy storage unit 500 may decrease during the reserve time period INTER3. Re-charging of the energy storage unit 500 may begin e.g. after the time $t_{SAG2}$.

$A_0$ and $-A_0$ denote peak values of the input currents during normal operation. $V_{MX}$ and $V_{MN}$ denote threshold values for the peak input voltage $V_1$. When the peak input voltage $V_1$ is detected to be in the normal range RNG1 between the threshold values $V_{MX}$ and $V_{MN}$, this may be interpreted to indicate a normal situation. When the peak input voltage $V_1$ is higher than the threshold value $V_{MX}$, this may indicate an overvoltage situation. When the peak input voltage $V_1$ is lower than the threshold value $V_{MX}$, this may indicate a voltage sag situation.

As shown in FIG. 5, the rectifier-inverter unit 300 of FIG. 1 may comprise an inductor unit 100 and a switch bridge 200. The rectifier-inverter unit 300 may be connected to nodes $T_{CA}$, $T_{CB}$ of the energy storage unit 500 and to the output nodes T1, T2, T3. The rectifier-inverter unit 300 may be arranged to generate the compensating currents $I_{1D}$, $I_{2D}$, $I_{3D}$ by transferring energy from the output nodes T1, T2, T3 to the energy storage unit 500, and by transferring energy from the energy storage unit 500 back to the output nodes T1, T2, T3. In an embodiment, the two-level switch bridge 200 shown FIG. 5 may be replaced with the three-level switch bridge 200 shown in FIG. 8a.

The energy storage unit 500 may comprise a first capacitor CA and a second capacitor CB connected in series between the positive and negative nodes RAIL1, RAIL2 of the switch bridge 200. The common node $T_{COM}$ of the capacitors CA, CB may be connected e.g. to the node TOD of the neutral phase PH0.

The inductor unit 100 and the switch bridge 200 may be arranged to together operate as a voltage step-up device, which transfers electrical energy from the nodes T1, T2, T3 to the capacitors CA, CB. In particular, the inductor unit 100 and the bridge 200 may pump electrical energy from a lower network voltage to a higher voltage of the capacitors CA, CB. At a later stage, the inductor unit 100 and the switch bridge 200 may transfer electrical energy from the capacitors CA, CB back to the nodes T1, T2, T3 i.e. back from a higher capacitor voltage $V_{CA}$, $V_{CB}$ to a lower network voltage $V_1$, $V_2$, $V_3$. The method may comprise converting alternating current to direct current (i.e. "rectification"), and converting direct current to alternating current (i.e. "inversion"). The switch bridge 200 may also be called as a converter bridge. The rectifier-inverter 300 may also be called as a voltage source converter (VSC).

The inductor unit 100 may comprise inductors L1, L2, L3. The inductors L1, L2, L3 may store energy during voltage step-up and step-down operations. The first inductor L1 has nodes 61, 62, the second inductor L2 has nodes 71, 72, and the third inductor L3 has nodes 81, 82. The inductors L1, L2, L3 store energy "reactively", and they may also be called as "reactors".

During operation, the voltages at the nodes 62, 72, 82 (with respect to the node $T_{com}$) may alternate substantially between the negative voltage $-V_{CB}$ and the positive voltage $V_{CA}$. The desired current (or voltage) waveform may be generated by controlling the voltage and current output of the switch bridge 200 by pulse width modulation (PWM). By using the pulse width modulation, the magnitude and phase of the compensating currents $I_{1D}$, $I_{2D}$, $I_{3D}$ may be controlled freely and almost instantaneously within certain limits.

The compensating currents $I_{1D}$, $I_{2D}$, $I_{3D}$ may be generated by controlling the average values of alternately increasing and decreasing currents $I_{1E}$, $I_{2E}$, $I_{3E}$ coupled through the inductors L1, L2, L3. The average values of the inductor currents $I_{1E}$, $I_{2E}$, $I_{3E}$ may, in turn, be controlled by controlling the average values of voltages at the nodes 62, 72, 82 of the switch bridge 200 by the pulse width modulation (PWM).

The frequency $f_{MOD}$ of the PWM modulation may be, for example, in the range of 5 kHz to 50 kHz. In particular, the frequency of the PWM modulation may be e.g. in the order of 10 kHz, and the compensating currents $I_{1D}$, $I_{2D}$, $I_{3D}$ may be arranged to compensate harmonic current components e.g. up to the 50th harmonic of the mains frequency $f_0$. For example, in case of the mains frequency $f_0$=50 Hz, harmonic current components up to 2.5 kHz may be compensated (=50th harmonic of the mains frequency 50 Hz). Thanks to the relatively high switching rate, the size of the component may be reduced. Also acoustic noise generated by the device may be reduced and/or shifted to a frequency range which is less annoying to human ears.

The switch bridge 200 may be arranged to connect the inductor L1 alternately to a positive node $T_{CA}$ and to a negative node $T_{CB}$ of the energy storage unit 500 at the switching frequency $f_{MOD}$ such that an averaged value of the inductor current $I_{1E}$ is substantially equal to the compensating current $I_{1D}$. In other words, the switch bridge 200 may be arranged to alternately increase and decrease the current $I_{1E}$ of the inductor L1 by repetitively connecting and disconnecting the first inductor L1 to/from the negative node $T_{CB}$ at the switching frequency $f_{MOD}$. The switch bridge 200 may be arranged to connect the inductors L1, L2, L3 alternately to the positive node $T_{CA}$ and to the negative node $T_{CB}$ at a switching frequency $f_{MOD}$ such that averaged values of the inductor currents $I_{1E}$, $I_{2E}$, $I_{3E}$ are substantially equal to the corresponding compensating currents $I_{1D}$, $I_{2D}$, $I_{3D}$.

The operation of the bridge 200 may cause rapid current fluctuations, which may be filtered out before the compensating currents $I_{1D}$, $I_{2D}$, $I_{3D}$ are coupled to the nodes T1, T2, T3. The fluctuations caused by opening and closing the switches of the bridge 200 may be filtered out e.g. by using a passive low-pass filter 350. The compensating current $I_{1D}$ for the first phase PH1 may be provided by low-pass filtering an inductor current $I_{1E}$ coupled through the first inductor L1. The compensating current $I_{2D}$ for the second phase PH2 may be provided by low-pass filtering an inductor current $I_{2E}$ coupled through the second inductor L2. The compensating current $I_{3D}$ for the third phase PH3 may be provided by low-pass filtering an inductor current $I_{2E}$ coupled through the third inductor L3.

The power conditioning device 600 may be arranged to generate substantially sinusoidal voltages $V_1$, $V_2$, $V_3$ for the three phases PH1, PH2, PH3 with desired amplitude, frequency and phase angle. The power conditioning device 600 can be used for reactive power compensation and/or for compensation of harmonic currents. With fast vector control, the device may provide ability to control active power and reactive power independently. The control unit 400 (FIG. 1) may comprise a data processor, which is configured to implement the vector control.

The switch bridge 200 may comprise switches SW1A, SW1B, SW2A, SW2B, SW3A, SW3B and diodes D1A, D1B, D2A, D2B, D3A, D3B. The switch bridge 200 may comprise three pairs of switches. A first pair SW1A, SW1B may be connected between the first positive node RAIL1 and the second negative node RAIL2. The common node 62 of the first pair may be connected to the first inductor L1. A second pair SW2A, SW2B may be connected between the nodes RAIL1, RAIL2. The common node 72 of the second pair may be connected to the second inductor L2. A third pair SW3A, SW3B may be connected between the nodes RAIL1, RAIL2. A common node 82 of the third pair may be connected to the third inductor L3. The first leg LEG1 of the switch bridge 200 may comprise the node 62, the switches SW1A, SW1B and the diodes D1A, D1B. The second leg LEG2 of the switch bridge 200 may comprise the node 72, the switches SW2A, SW2B and the diodes D2A, D2B. The third leg LEG3 of the switch bridge 200 may comprise the node 82, the switches SW3A, SW3B and the diodes D3A, D3B.

Diodes D1A, D1B, D2A, D2B, D3A, D3B may be connected anti-parallel with the switches. During normal operation, the absolute values of the voltages $V_{CA}$, $V_{CB}$ of the capacitors CA, CB may be higher than peak mains voltage present in the nodes T1, T2, T3, and the polarity of the diodes may be arranged such that there is no uncontrolled discharging of the capacitors CA, CB via the diodes.

The magnitudes of the compensating currents $I_{1D}$, $I_{2D}$, $I_{3D}$ may be controlled by controlling timing of operation of the switches of the switch bridge 200. The switches may be controlled by the control signals $S_{1A}$, $S_{1B}$, $S_{2A}$, $S_{2B}$, $S_{3A}$, $S_{3B}$. The signal $S_{1A}$ may control operation of the switch SW1A, the signal $S_{1B}$ may control operation of the switch SW1B, the signal $S_{2A}$ may control operation of the switch SW2A, the signal $S_{2B}$ may control operation of the switch SW2B, the signal $S_{3A}$ may control operation of the switch SW3A, the signal $S_{3B}$ may control operation of the switch SW3B. The control signals $S_{1A}$, $S_{1B}$, $S_{2A}$, $S_{2B}$, $S_{3A}$, $S_{3B}$ may be e.g.

logical signals. A value of 1 may refer to a situation where the corresponding switch is in a conducting state (closed switch). A value of 0 may refer to a situation where the corresponding switch is in a non-conducting state (open switch).

The control unit 400 may be arranged to provide a control signal $S_B$. The control signal $S_B$ may comprise e.g. the signals $S_{1A}$, $S_{1B}$, $S_{2A}$, $S_{2B}$, $S_{3A}$, $S_{3B}$. The control signal $S_B$ may comprise e.g. the signals $S_{1A}$, $S_{2A}$, $S_{3A}$, and the signals $S_{1B}$, $S_{2B}$, $S_{3B}$ may also be generated by the bridge 200 based on the signals $S_{1A}$, $S_{2A}$, $S_{3A}$. In other words, it may be sufficient to send only the control signals $S_{1A}$, $S_{2A}$, $S_{3A}$, from the control unit 400. Normally, both switches (e.g. SW and SW1B) of a pair should not be in the conducting state simultaneously, because this would mean short-circuiting the charged capacitors CA, CB.

During normal operation, the voltage $V_{CA}$ over the first capacitor CA, i.e. the voltage of the first node RAIL1 with respect to the node $T_{COM}$ is higher than the peak (line to neutral) voltage of the nodes T1, T2, T3. This prevents uncontrolled charging of the capacitor CA via the diodes D1A, D2A, D3A. Also the voltage difference $V_{CB}$ over the second capacitor DB is higher than the peak voltage difference between each node T1, T2, T3 and the node $T_{COM}$. This prevents uncontrolled charging of the capacitor CB via the diodes D1B, D2B, D3B.

The switch bridge 200 should be operated such that the absolute values of the voltages $V_{CA}$, $V_{CB}$ are kept below a predetermined limit, in order to avoid damaging the switches SW1A, SW1B, SW2A, SW2B, SW3A, SW3B and the capacitors CA, CB due to electric breakdown.

The nominal RMS line-to-neutral voltages $V_{1T}$, $V_{2T}$, $V_{3T}$ of the output nodes T1, T2, T3 may be e.g. from 230 V to 400 V. The positive peak voltage of the nodes T1, T2, T3 corresponding to the RMS voltage 230 V is +325 V (=the RMS voltage multiplied by $\sqrt{2}$). The negative peak voltage of the nodes T1, T2, T3 corresponding to the RMS voltage 230 V is −325 V. In this case, the voltage of the positive node RAIL1 may be kept e.g. in the range of +350 V to +450 V, and the voltage of the negative node RAIL2 may be kept e.g. in the range of −350 V to −450 V with respect to the common node $T_{COM}$.

$I_{CA}$ denotes a current to the first capacitor CA, and $I_{CB}$ denotes a current to the second capacitor CB. $I_{S1A}$ denotes a current conducted by the switch SW1A or by the diode D1A. $I_{S1B}$ denotes a current conducted by the switch SW1B or by the diode D1B. $I_{CA}$ denotes a current conducted from the node RAIL1 to the node $T_{CA}$ of the energy storage unit 500, and $I_{CB}$ denotes a current conducted from the node RAIL2 to the node $T_{CB}$ of the energy storage unit 500.

The switch bridge 200 may be implemented e.g. by using IGBT transistors (Insulated Gate Bipolar Transistors) and/or MOSFET transistors (Metal Oxide Semiconductor Field Effect Transistors). The switching frequency $f_{MOD}$ of each individual switch of the switch bridge 200 may be e.g. in the range from 5 kHz to 50 kHz, preferably in the range from 7 kHz to 18 kHz.

$V_{L1}$ denotes a voltage between nodes 61, 62 of the inductor L1. $V_{L2}$ denotes a voltage between nodes 71, 72 of the inductor L2. $V_{L3}$ denotes a voltage between nodes 81, 82 of the inductor L3. The inductor L1 may be connected to the output node T1, the inductor L2 may be connected to the output node T2, and the inductor L3 may be connected to the output node T3. The cores of the inductors L1, L2, L3 may comprise ferromagnetic material, which is in an amorphous state. Thanks to the amorphous state, losses in the material can be very low. Consequently, the currents coupled through the inductors L1, L2, L3 may fluctuate at the high frequency $f_{MOD}$ without causing excessive energy loss. In an embodiment, the combined electrical losses for transferring energy from the output nodes T1, T2, T3 to the capacitors CA, CB and back to the nodes T1, T2, T3 may be e.g. smaller than or equal to 3%.

The inductors L1, L2, L3 may be connected to the output nodes T1, T2, T3 by a passive filter unit 350. The passive filter unit 500 may comprise e.g. inductors L11, L12, L13, and capacitors C1, C2, C3 which are arranged to form an LCL low pass filter (the acronym "LCL" refers to "inductor-capacitor-inductor") together with the inductors L1, L2, L3 of the inductor unit 100. The node 61 of the inductor L1 may be connected to the output node T1 via an auxiliary inductor L11, the node 71 of the inductor L2 may be connected to the output node T2 via an auxiliary inductor L12, and the node 81 of the inductor L3 may be connected to the output node T3 via an auxiliary inductor L13. The passive filter unit 500 may comprise resistors R1, R2, R3 to provide damping near the resonance frequency of the LCL filter. The common node 351 of the capacitors C1, C2, C3 may be connected to the neutral phase (i.e. to the node T0) in order to reduce electrical noise caused by opening and closing the switches of the bridge 200. The order of the resistors R1, R2, R3 and the capacitors C1, C2, C3 may also be interchanged. In other words, the resistors may R1, R2, R3 may have a common node, which is connected to the neutral phase. In order to further suppress switching noise, the common node $T_{COM}$ of the capacitors CA, CB may be connected to the node T0 directly or via optional inductors L4 and/or L5

The first node RAIL1 of the switch bridge 200 may be connected to the node $T_{CA}$ of the capacitor CA. The second node RAIL2 of the switch bridge 200 may be connected to the node $T_{CB}$ of the capacitor CB. The capacitors CA, CB may be connected in series such that the common node $T_{COM}$ of the capacitors CA, CB is effectively connected to the node T0. The voltage of the common node $T_{COM}$ may be substantially equal to the voltage $V_{0L}$ of the neutral phase PH0 (within the time scale of $T_0/2$). The common node $T_{COM}$ of the capacitors CA, CB may be connected to node T0. The common node $T_{COM}$ may be connected to node T0 e.g. via an auxiliary inductor L4 and/or L5. The power conditioning device 600 may comprise voltage sensors or energy sensors, which are arranged to provide a signal $S_C$ indicative of the voltages $V_{CA}$, $V_{CB}$ of the capacitors CA, CB. The power conditioning device 600 may comprise a voltage sensor unit 510, 510a for monitoring voltages $V_{CA}$, $V_{CB}$ of capacitors CA, CB (FIGS. 7a-7e).

The power conditioning device 600 comprises an energy storage unit 500, which in turn may comprise the capacitors CA, CB. The first node RAIL1 of the switch bridge 200 may be connected to the node $T_{CA}$ of the energy storage unit 500. The second node RAIL2 of the switch bridge 200 may be connected to the node $T_{CB}$ of the energy storage unit 500. The energy storage unit 500 may comprise voltage sensors or energy sensors, which are arranged to provide a signal $S_C$ indicative of energy stored in the energy storage unit 500.

The control unit 400 may be configured to drive the switch bridge 200 such that the voltage of the node $T_{CA}$ of the first capacitor CA is higher than the peak voltage of the nodes T1, T2, T3.

The capacitance value of the capacitor CA may be substantially equal to the capacitance value of the capacitor CB, or the capacitance value of the capacitor CA may be different from the capacitance value of the capacitor CB. The capacitor unit 300 may comprise voltage balancing resistors (not shown), which may be arranged to reduce a voltage unbalance between the capacitors CA and CB due to different leakage currents. The voltage balancing resistors may also act as discharging resistors arranged to reduce the voltage of the capacitors CA, CB to a safe level when the device 600 is not operating. The device 600 may further comprise additional switches and resistors (not shown) for pre-charging the capacitors prior to stable operation.

The power conditioning unit 600 may comprise a current monitoring unit 420, and/or a current monitoring unit 320. The current monitoring unit 420 may comprise current sensors M2, which may provide a signal $S_D$ indicative of the compensating currents $I_{1D}$, $I_{2D}$, $I_{3D}$. The current monitoring unit 320 may comprise current sensors M3, which may provide a signal $S_E$ indicative of the inductor currents $I_{1E}$, $I_{2E}$, $I_{3E}$. The voltage sensor unit 510 may comprise voltage sensors M4 for monitoring the capacitor voltages $V_{CA}$, $V_{CB}$. The current sensors may comprise e.g. current transformers and/or Hall effect current sensors. The voltage sensors may be e.g. Hall effect voltage sensors.

Figure 6A:
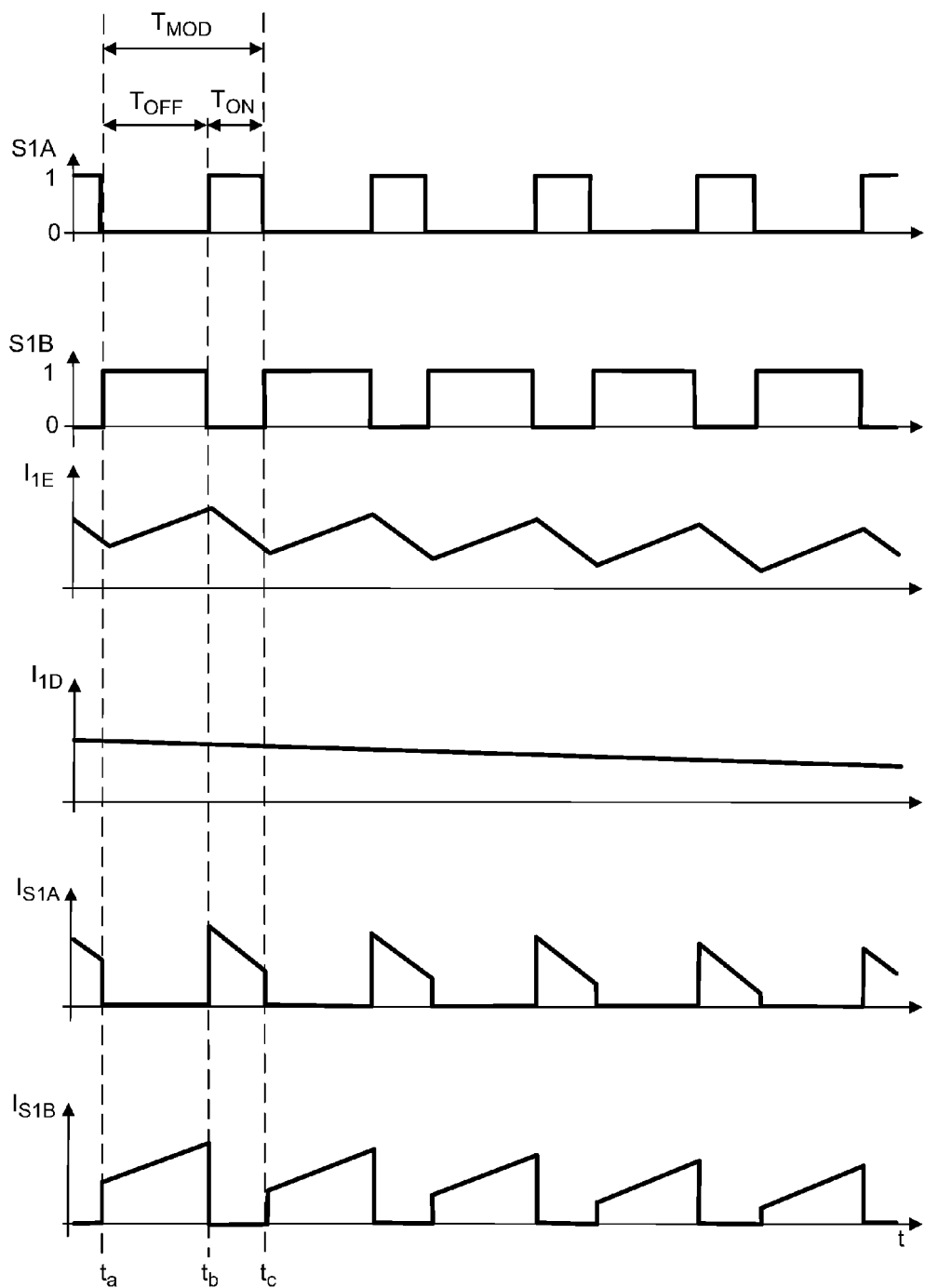
FIG. 6a shows, by way of example, timing of signals and currents related to operation of the first leg of the switch bridge.

The timing chart of FIG. 6a illustrates operation of the switch bridge 200 in a simplified situation, where the contribution of the inductors L2, L3 and the switches SW2A, SW2B, SW3A, SW3B is not taken into account.

$T_{ON}$ denotes the length of a time period during which the switch SW1A is set to the conducting state, and $T_{OFF}$ denotes the length of an time period during which the switch SW is set to the non-conducting state. $T_{MOD}$ denotes the combined length of said two time periods, i.e. $T_{MOD}=T_{ON}+T_{OFF}$. The switching frequency (switching rate) $f_{MOD}$ of the switch SW1A is equal to $1/T_{MOD}$. The duty cycle of the switch SW is equal to $T_{ON}/T_{MOD}$.

Figure 6B:
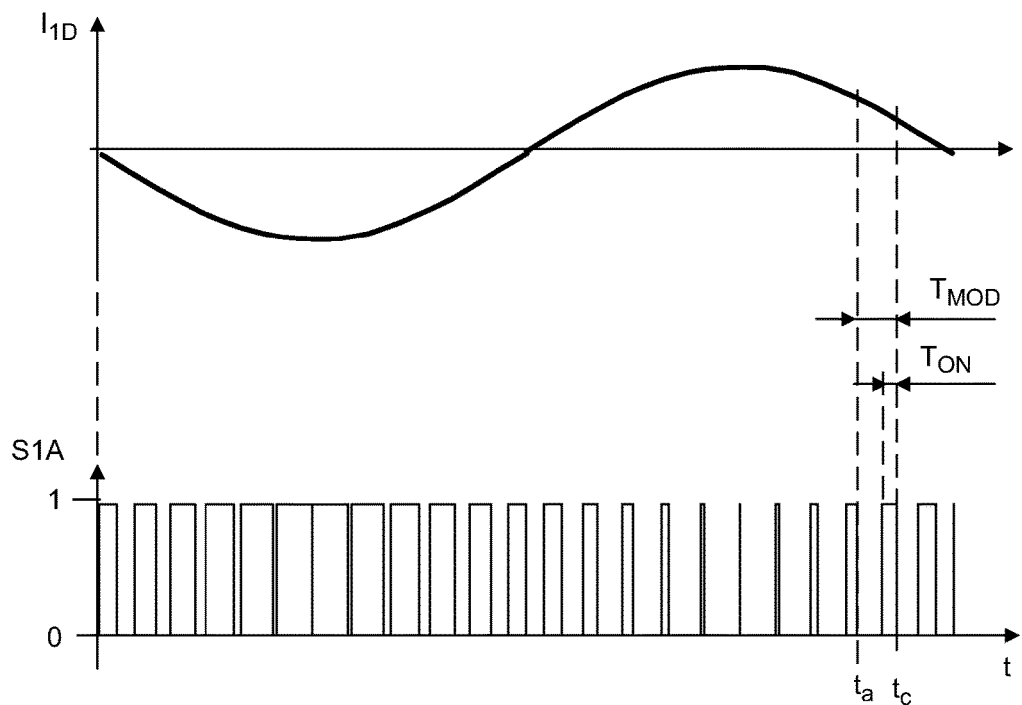
FIG. 6b shows, by way of example, forming a desired waveform of a compensating current by pulse width modulation.

Referring to FIG. 6b, a desired current waveform of a compensating current $I_{1D}$ may be provided by adjusting the duty cycle $T_{ON}/T_{MOD}$.

Referring back to the fourth curve from the top in FIG. 6a, the time derivative of the compensating current $I_{1D}$ may depend on the duty cycle $T_{ON}/T_{MOD}$. For example, the duty cycle $T_{ON}/T_{MOD}$ may be adjusted such that the generated compensating current $I_{1D}$ slowly decreases.

At the time $t_a$, the switch SW1B may be set to the conducting state (the value of the control signal S1B is equal to 1), the inductor L1 is thereby connected between the node RAIL2 and the output node T1, and the inductor current $I_{1E}$ increases. Consequently, energy may be transferred from the node T1 to the inductor L1.

At the time $t_b$, the switch SW1B may be set to the non-conducting state (S1B=0), and the inductor L1 is disconnected from the negative node RAIL2. The inductor current $I_{1E}$ starts to decrease and the polarity of the voltage $V_{L1}$ over the inductor L1 is reversed. The inductor current $I_{1E}$ may now flow via the diode D1A to the positive node RAIL1 Consequently, energy may be transferred from the inductor L1 to the capacitor CA.

At the time $t_c$, the switch SW1B may be set to the conducting state (S1B=1), and the above-mentioned energy transfer cycle may be repeated.

In this simplified example, the first capacitor CA was charged and the second capacitor CB was discharged via the inductor L1. The charging state of the capacitors CA, CB may be balanced by timed operation of all switches of the switch bridge 200. In particular, when the output node T1 has a positive voltage, the capacitor CB may be charged by transferring energy from those output nodes T2, T3 which have a negative voltage.

Energy stored in the capacitor CA may be transferred back to the output node T1, and/or to the other output nodes T2, T3 by adjusting timing of the control signals $S_{1A}$, $S_{2A}$, $S_{3A}$, i.e. by adjusting timing of the states of the legs of the switch bridge 200.

In particular, a compensating current $I_{1D}$ may be generated by:
transferring energy from a first node T1 to an inductor L1,
charging a capacitor CA by transferring energy from the inductor L1 to the capacitor CA, and
discharging the capacitor CA by repetitively connecting the inductor L1 to the capacitor CA by a switch (e.g. SW1A) in order to generate the compensating current $I_{1D}$.

The method for compensating one or more non-active current components may comprise:
measuring a load current $I_{1L}$,
determining a compensating current $I_{1D}$ based on the measured load current $I_{1L}$,
transferring energy from a node T1 to an inductor L1,
charging a capacitor CA by transferring energy from the inductor L1 to the capacitor CA, and
discharging the capacitor CA by repetitively connecting the inductor L1 to the capacitor CA by a switch SW1A in order to generate the compensating current $I_{1D}$,
wherein the voltage $V_{CA}$ of said capacitor CA is higher than the voltage of the node T1, and the switching frequency ($f_{MOD}$) of said switch (SW1A) is in the range from 5 kHz to 50 kHz.

Energy transfer from the nodes T1, T2, T3 to the capacitors CA, CB comprises storing energy in the inductors L1, L2, L3. During normal operation, the voltage of the positive node RAIL1 is always higher than the voltage of the network node T1. Therefore, the compensating current $I_{1D}$ provided by the node T1 can charge the capacitor CA via the diode D1A only when the inductor L1 provides an additional voltage difference $V_{L1}$, which increases the voltage of the node 62 to the voltage of the positive node RAIL1 (e.g. during the period from $t_b$ to $t_c$ in FIG. 6a) or slightly above the voltage of the positive node RAIL1. The voltage difference $V_{L1}$ for charging the capacitor CA is generated by consuming energy previously stored in the inductor L1. Energy may be stored in the inductor L1 by connecting it to the negative node RAIL2 by the switch SW1B (e.g. during the period from $t_a$ to $t_b$ in FIG. 6a).

Transferring energy from the capacitor CA to the network node T1 also comprises storing energy in the inductor L1. When the switch SW1A is closed, the absolute value $|I_{1E}|$ of current $I_{1E}$ from the capacitor CA increases, wherein energy is transferred from the capacitor CA to the node T1. As the absolute value $|I_{1E}|$ of the current increases, a portion of the energy removed from the capacitor CA is stored in the inductor L1. In this case the energy stored in the capacitor CA cannot be directly transferred to the network node T1, but it may be utilized for charging the second capacitor CB via the diode D1B. Energy stored in the second capacitor CB may be subsequently fed to the network by closing the switch SW1B.

The operation of the filter device 600 may comprise e.g. the following steps in the following order:
transferring energy from a node T1 to an inductor L1,
transferring energy from the inductor L1 to the first capacitor CA,
transferring energy from the first capacitor CA to the inductor L1,
transferring energy from the inductor L1 to a second capacitor CB, and
transferring energy from the second capacitor CB to the node T1.

Connecting the inductor L1 to the positive node RAIL1 by the switch SW1A (or by the diode D1A) may decrease the inductor current $I_{1E}$ (see e.g. the time period from $t_b$ to $t_c$ in FIG. 6a). Connecting the inductor L1 to the negative node RAIL2 by the switch SW1B (or by the diode D1B) may increase the inductor current $I_{1E}$ (see e.g. the time period from $t_b$ to $t_c$ in FIG. 6a).

The filter device 600 may also be understood to operate such that the inductor currents $I_{1E}$, $I_{2E}$, $I_{3E}$ fluctuate around the desired compensating current values $I_{1D}$, $I_{2D}$, $I_{3D}$. The averaged inductor current $I_{1E}$, when averaged over a single modulation period $T_{MOD}$, may be substantially equal to the compensating current $I_{1D}$. The control unit 400 may be arranged to control the bridge 200 so that the average values of the fluctuating inductor currents $I_{1E}$, $I_{2E}$, $I_{3E}$ are substantially equal to the compensating current values $I_{1D}$, $I_{2D}$, $I_{3D}$.

The method for compensating a distorted current waveform of a three-phase network 900 may comprise:
measuring a load current $I_{1L}$,
determining a compensating current $I_{1D}$ based on the measured load current $I_{1L}$,
generating the compensating current $I_{1D}$ by using a combination of a switch bridge 200 and inductors L1, L2, L3 to transfer energy from the three-phase network 900 to a capacitor CA and to return energy from the capacitor CA to the three-phase network 900,
wherein the switch bridge 200 is arranged to alternately increase and decrease an inductor current $I_{1E}$ of a first inductor L1 of said inductors L1, L2, L3 by connecting the first inductor L1 to the capacitor CA at a switching frequency $f_{MOD}$ such that an averaged value of the inductor current $I_{1E}$ is substantially equal to the compensating current $I_{1D}$, wherein the switching frequency $f_{MOD}$ is in the range from 5 kHz to 50 kHz, preferably in the range from 7 kHz to 18 kHz.

The method may comprise transferring energy from a first node T1 via the inductor L1 to the energy storage unit 500, and transferring energy from the energy storage unit 500 via the inductor L1 back to the first node T1.

The method may comprise transferring energy from a first node T1 via the inductor L1 to the energy storage unit 500, and transferring energy from the energy storage unit 500 via the inductor L2 to the second node T2.

Referring to FIG. 5, the switch bridge 200 may comprise three legs LEG1, LEG2, LEG3, and each leg may have two operating states (i.e. only one switch of each leg is in the conducting state at a given time). Thus, the whole bridge 200 may have eight (=$2^3$) possible different states.

Figure 6C:
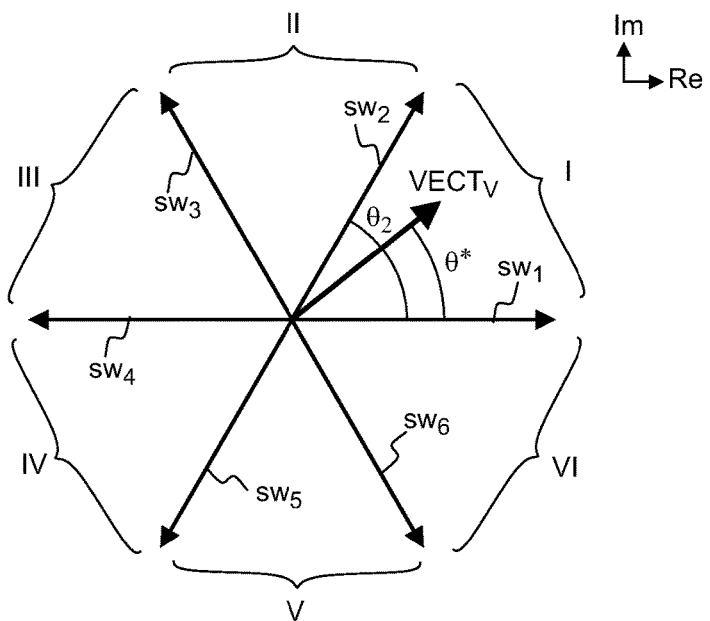
FIG. 6c shows a vector diagram related to controlling the switch bridge.

Referring to FIG. 6c, the (desired) state of the switch bridge 200 may be defined by three-dimensional switching vectors sw. Eight different switching vectors for the two-level switch bridge are listed in Table 1.

TABLE 1

Switching vectors sw for a 3-leg switch bridge.

| Symbol notation | Element notation |
|---|---|
| $sw_1$ | (1,−1,−1) |
| $sw_2$ | (1,1,−1) |
| $sw_3$ | (−1,1,−1) |
| $sw_4$ | (−1,1,1) |
| $sw_5$ | (−1,−1,1) |
| $sw_6$ | (1,−1,1) |
| $sw_{0-}$ | (−1,−1,−1) |
| $sw_{0+}$ | (1,1,1) |

The first element of a switching vector may define the state of the first leg, the second element of the switching vector may define the state of the second leg, and the third element of the switching vector may define the state of the third leg. The state value −1 may indicate that the voltage of the leg is substantially equal to the voltage $-V_{CB}$. The state value 1 may indicate that the voltage of the leg is substantially equal to the voltage $V_{CA}$. For example, the element notation (1,−1,−1) may indicate that the voltage of the node 62 of the first leg LEG1 is substantially equal to the voltage $V_{CA}$, the voltage of the node 72 of the second leg LEG2 is substantially equal to the voltage $-V_{CB}$, and the voltage of the node 82 of the third leg LEG3 is substantially equal to the voltage $-V_{CB}$.

A control signal sent from the control unit 400 may comprise a value of a switching vector. For example, the signal $S_{1A}$ may define the first element of the switching vector, the signal $S_{2A}$ may define the second element, and the signal $S_{3A}$ may define the third element.

An optimum switching sequence for the switch bridge 200 may be determined by using space vector transformations, in particular by using the so-called synchronous reference frame theory, which includes the concept of the zero sequence voltage and the concept of the zero sequence current.

The switches of the bridge 200 may be operated such that the device 600 generates the required compensating currents $I_{1D}$, $I_{2D}$, $I_{3D}$. The control unit 400 may determine the switching vectors and the durations for each applied switching vectors such that the compensating currents $I_{1D}$, $I_{2D}$, $I_{3D}$ may be generated.

As an intermediate step, a voltage reference vector $VECT_V$ and a zero-sequence voltage reference $u_z^*$ may be determined. The complex-valued voltage reference vector $VECT_V$ may represent voltages of the nodes 62, 72, 82 averaged over a modulation period $T_{MOD}$, and the real-valued zero-sequence voltage reference $u_z^*$ may represent a phase imbalance at the nodes 62, 72, 82 averaged over a modulation period $T_{MOD}$. The voltage reference vector $VECT_V$ and the zero-sequence voltage reference $u_z^*$ define a desired voltage output of the bridge 200. The complex-valued voltage reference vector $VECT_V$ and the real-valued zero-sequence voltage reference $u_z^*$ may be calculated e.g. by the alpha-beta transformation from desired average voltages of the nodes 62, 72, 82.

The desired average voltages of the nodes 62, 72, 82 may be determined based on the instantaneous voltages $V_{1T}$, $V_{2T}$, $V_{3T}$ of the network nodes T1, T2, T3, and based on the desired compensating currents $I_{1D}$, $I_{2D}$, $I_{3D}$ such that the device 600 generates the compensating currents $I_{1D}$, $I_{2D}$, $I_{3D}$ when the output of the bridge 200 is coupled to the network terminals T1, T2, T3 via the inductors L1, L2, L3.

After the voltage reference vector $VECT_V$ and the zero-sequence voltage reference $u_z^*$ needed for generating the desired compensating currents $I_{1D}$, $I_{2D}$, $I_{3D}$ have been determined, the corresponding switching sequence of the bridge 200 may be determined e.g. by using the vector diagram of FIG. 6c.

The 3-leg bridge 200 can be controlled by using the eight different switching vectors listed in Table 1. The switching vectors $sw_{0-}$ (−1,−1,−1) and $sw_{0+}$ (1,1,1) are so-called zero switching vectors, which may be used for controlling the zero sequence voltage. The remaining six switching vectors may be associated with boundaries of sectors in the complex plane, as shown in FIG. 5b.

The vectors $sw_1$ (1,−1,−1) and $sw_2$ (1,1,−1) define a first sector (I). The vectors $sw_2$ (1,1,−1) and $sw_3$ (−1,1,−1) define a second sector (II). The vectors $sw_3$ (−1,1,−1) and $sw_4$ (−1,1,1) define a third sector (III), the vectors $sw_4$ (−1,1,1) and $sw_5$ (−1,−1,1) define a fourth sector (IV), the vectors $sw_5$ (−1,−1,1) and $sw_6$ (1,−1,1) define a fifth sector (V), and the vectors $sw_6$ (1,−1,1) and $sw_1$ (1,−1,−1) define a sixth sector (VI). The sectors may be indicated e.g. by the Roman numerals I, II, III, IV, V, and VI. The angular width of each sector is 60 degrees. Re refers to the real axis and Im refers to the imaginary axis of the complex plane.

The desired voltages at the nodes 62, 72, 82 may be generated by selecting and using the two switching vectors, which are closest to the determined voltage reference vector $VECT_V$ in the complex plane. For example, when the voltage reference vector $VECT_V$ resides in the 1st sector, the switching vectors $sw_1$ (1,−1,−1) and $sw_2$ (1,1,−1) may be used for implementing the desired voltage vector $VECT_V$.

In addition to the selected ones, the zero switching vectors $sw_{0-}$ (−1,−1,−1) and $sw_{0+}$ (1,1,1) may be used e.g. in the beginning and in the end of each modulation half period in order to generate the desired zero-sequence voltage.

The determined voltage reference vector $VECT_V$ resides in one of the six sectors shown in FIG. 6c. During the fundamental period $T_0$, the voltage reference vector $VECT_V$ may draw a complete circle in the complex plane.

This means that during the fundamental period $T_0$, six different modulation schemes may be consecutively applied.

Table 2 indicates, by way of example, a modulation sequence (i.e. a switching sequence) based on the two switching vectors selected by using the sector diagram of FIG. 6c. Each modulation period may be started by using the zero switching vector $sw_{0-}$ (−1,−1,−1), followed by the first selected switching vector, the second selected switching vector, and finally by the other zero switching vector $sw_{0+}$ (1,1,1). The order may be selected such that the state of only one control parameter ($S_{1A}$, $S_{2A}$, $S_{3A}$) needs to be changed at a time, i.e. so that only one element of the switching vector is changed at a time. Yet in other words, the first active switching vector may be selected such that the states of switches in only one leg of the bridge 200 needs to be changed at a time.

The switch bridge may be driven such that only one switch of each leg of the switch bridge is in the conducting state at a time.

After the midpoint of the modulation period $T_{MOD}$, the switching vectors may be applied in reverse order. $T_{Z1}$ denotes duration for using the zero switching vector (−1,−1,−1), $T_1$ denotes duration for using the first selected switching vector, $T_2$ denotes duration for using the second selected switching vector, and $T_{Z2}$ denotes duration for using the zero switching vector (1,1,1). The duration of the 1st modulation half period may be equal to the duration of the 2nd modulation half period. The period $T_{ON}$ shown in FIG. 6a may be equal to the sum $T_1+T_2+T_{Z2}+T_{Z2}+T_2+T_1$.

TABLE 2

An example of a modulation sequence, which may be used when the voltage vector $VECT_V$ resides in the first sector I of the complex plane.

| Control parameter | 1st modulation half period | | | | 2nd modulation half period | | | |
|---|---|---|---|---|---|---|---|---|
| | 1st selected | 2nd selected | | | 2nd selected | 1st selected | | |
| S1A | 0 | 1 | 1 | 1 | 1 | 1 | 1 | 0 |
| S2A | 0 | 0 | 1 | 1 | 1 | 1 | 0 | 0 |

TABLE 2-continued

An example of a modulation sequence, which may be used when the voltage vector $VECT_V$ resides in the first sector I of the complex plane.

| Control parameter | 1st modulation half period | | | | 2nd modulation half period | | | |
|---|---|---|---|---|---|---|---|---|
| | 1st selected | 2nd selected | | | 2nd selected | 1st selected | | |
| S3A | 0 | 0 | 0 | 1 | 1 | 0 | 0 | 0 |
| Duration | $T_{Z1}$ | $T_1$ | $T_2$ | $T_{Z2}$ | $T_{Z2}$ | $T_2$ | $T_1$ | $T_{Z1}$ |

By using the element notation, the modulation sequence of table 2 may comprise using the switching vectors (−1,−1,−1), (1,−1,−1), (1,1,−1), (1,1,1), (1,1,1), (1,1,−1), (1,−1,−1), (−1,−,1,−1). By using the symbol notation, said modulation sequence may comprise using the switching vectors $sw_{0-}$, $sw_1$, $sw_2$, $sw_{0+}$, $sw_{0+}$, $sw_2$, $sw_1$, $sw_{0-}$.

The duration ($T_{Z1}$, $T_1$, $T_2$, $T_{Z2}$) of each switching state of the modulation sequence may be calculated from the values of the length of the voltage reference vector $VECT_V$, from the phase angle of the $VECT_V$, and from the magnitude of the zero sequence reference voltage $u_z^*$.

In particular, the durations of the periods $T_1$, $T_2$, $T_{Z1}$, $T_{Z2}$ may be calculated by using the following equations:

$$T_1 = \sqrt{3}\frac{T_{MOD}}{2}\frac{|VECT_V|}{V_{CA}+V_{CB}}\sin(\theta_2-\theta^*) \quad (4)$$

$$T_2 = \sqrt{3}\frac{T_{MOD}}{2}\frac{|VECT_V|}{V_{CA}+V_{CB}}\sin(\theta^*-\theta_1) \quad (5)$$

$$T_z = \frac{T_{MOD}}{2}-(T_1+T_2) \quad (6)$$

$$k = \frac{1}{T_z}\left(\pm\frac{T_1}{6}\pm\frac{T_2}{6}+\frac{T_z}{2}-\frac{T_{MOD}}{2}\frac{u_z^*}{V_{CA}+V_{CB}}\right) \quad (7)$$

$$T_{z1} = kT_z \quad (8)$$

$$T_{z2} = (1-k)T_z \quad (9)$$

where $T_{MOD}$ denotes the duration of the modulation period ($T_{MOD}=2\cdot(T_{Z1}+T_1,T_2+T_{Z2})$), $|VECT_V|$ denotes the length of the voltage vector $VECT_V$, $V_{CA}$ and $V_{CB}$ denote the voltages of capacitors, $\theta^*$ denotes the angle of the voltage vector $VECT_V$, $\theta_1$ and $\theta_2$ denote the angles of the active (selected) switching vectors forming the sector where the voltage vector $VECT_V$ resides, $T_z=T_{Z1}+T_{Z2}$, $u_z^*$ denotes the zero-sequence voltage reference calculated by using the synchronous reference frame theory, and k denotes a weighting coefficient for providing the desired zero-sequence voltage reference. All angles may be defined in relation to the real axis (Re) of the stationary reference frame.

The control unit 400 of the power conditioning device 600 may be configured to:

determine a voltage vector $VECT_V$ based on measured load currents $I_{1L}$, $I_{2L}$, $I_{3L}$ and based on voltages $V_1$, $V_2$, $V_3$, select switching vectors based on the determined voltage vector $VECT_V$, determine durations $T_1$, $T_2$ for each selected switching vector sw based on the determined voltage vector $VECT_V$, and drive the switch bridge 200 by using the selected switching vectors SW and the determined durations $T_1$, $T_2$.

During normal operation in the mode MODE1, the voltages $V_1$, $V_2$, $V_3$ may be measured. During the reserve period, the voltage values V1, V2, V3 may be generated by a function generator or by a data processor.

The durations $T_{Z1}$, $T_1$, $T_2$, $T_{Z2}$ of the applied switching vectors may be determined such that the following conditions are fulfilled:

1st priority: The capacitor voltages $V_{CA}$ and $V_{CB}$ should be kept below a maximum limit in order to avoid damaging the capacitors, the switches, and the diodes.

2nd priority: The capacitor voltages $V_{CA}$ and $V_{CB}$ should be kept above a minimum limit in order to prevent uncontrolled currents via the diodes of the bridge.

3rd priority: The compensating currents $I_{1D}$, $I_{2D}$, $I_{3D}$ should be generated.

4th priority: Capacitor voltages $V_{CA}$ and $V_{CB}$ should be kept in the vicinity of a predetermined optimum voltage in order to ensure that the device 600 is capable of absorbing and providing energy in rapidly varying load conditions.

The method may comprise:

determining a voltage vector $VECT_V$ based on measured load currents $I_{1L}$, $I_{2L}$, $I_{3L}$ and based on voltage values $V_1$, $V_2$, $V_3$ of the three-phase network 900, selecting switching vectors sw based on the determined voltage vector $VECT_V$, determining durations $T_1$, $T_2$ for each selected switching vector sw based on the determined voltage vector $VECT_V$, and driving the switch bridge 200 by using the selected switching vectors sw and the determined durations $T_1$, $T_2$.

Figure 7A:
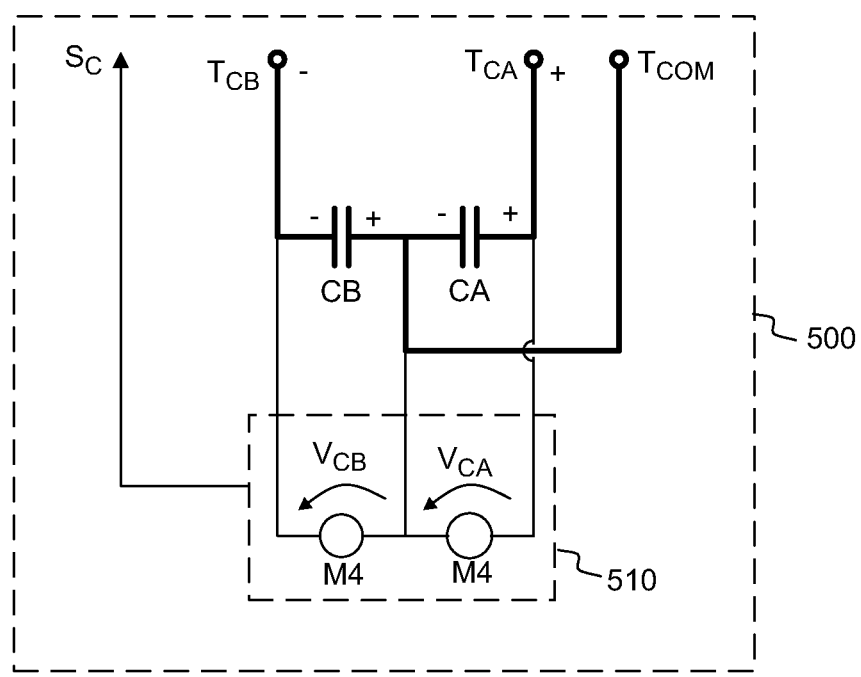
FIG. 7a shows an energy storage unit, which comprises capacitors.

Referring to FIG. 7a, the energy storage unit 500 may comprise the first capacitor CA and the second capacitor CB connected in series. The node $T_{CA}$ of the first capacitor CA may be connected to the first node RAIL1 of the switch bridge 200, and the node $T_{CB}$ of the second capacitor CB may be connected to the second node RAIL2 of the switch bridge 200. The common node $T_{COM}$ of the capacitors CA, CB may be connected to the node T0 of the network 900.

The energy storage unit 500 may comprise a voltage sensor unit 510 for monitoring voltages $V_{CA}$, $V_{CB}$ of the capacitors CA, CB. The voltage sensor unit 510 may comprise a voltage sensor M4 for monitoring the voltage $V_{CA}$ of the first capacitor CA and/or a voltage sensor M4 for monitoring the voltage $V_{CB}$ of the second capacitor CB. The voltage sensor unit 510 may provide a monitoring signal $S_C$ indicative of the voltage $V_{CA}$ and/or $V_{CB}$.

The capacitors CA, CB may be implemented e.g. by using liquid-filled capacitors (oil filled capacitors), by using electrolytic capacitors and/or by using electric double layer capacitors (supercapacitors). The first capacitor CA may, in turn, comprise one or more capacitor devices connected in series and/or in parallel. The second capacitor CB may, in turn, comprise one or more capacitor devices connected in series and/or in parallel.

During normal operation, the voltages of the capacitors CA, CB should be higher than the peak voltage $V_1$, $V_2$, $V_3$ of the inputs IN1, IN2, IN3. The energy storage unit 500 may optionally comprise a pre-charging unit (not shown) for pre-charging the capacitors CA, CB before the capacitors CA, CB are connected to the switch bridge 200 and/or before the output nodes T1, T2, T3 are connected to the inputs IN1, IN2, IN3.

Figure 7B:
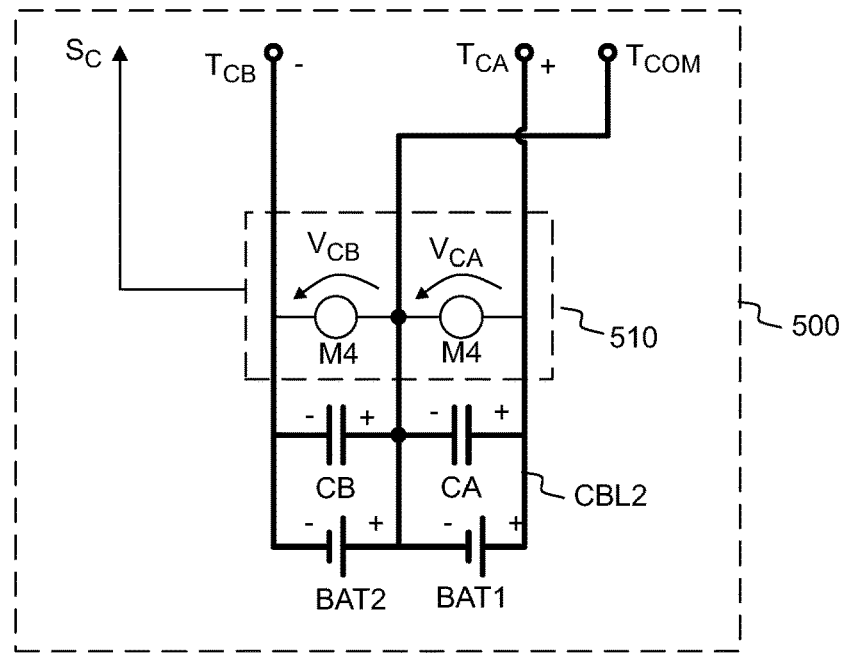
FIG. 7b shows an energy storage unit, which comprises capacitors and a battery, wherein the battery has an intermediate terminal connected to the common node of the capacitors.

Referring to FIG. 7b, the energy storage unit 500 may further comprise one or more batteries BAT1, BAT2 in order to increase the energy storage capacity.

The negative terminal of the battery BAT2 may be connected e.g. to the node $T_{CB}$, and the positive terminal of the battery BAT1 may be connected e.g. to the node $T_{CA}$. The batteries BAT1, BAT2 may be connected in series to form a combined battery. An intermediate terminal of the combined battery may be connected to the common node $T_{COM}$ of the capacitors CA, CB. The intermediate terminal may also be called as the common node of the batteries BAT1, BAT2.

The battery BAT1 and/or BAT2 may be rechargeable. The battery BAT1 and/or BAT2 may be e.g. a lead-acid battery, a nickel cadmium battery (NiCd), a nickel-metal hydride battery (NiMH), or a lithium battery. The battery BAT1 and/or BAT2 may in turn comprise one or more cells connected in series. The battery BAT1 may be connected to the capacitor CA e.g. by using a conductor CBL2.

The operating life of the battery BAT1,BAT2 may depend on the number of charging cycles experienced by the battery BAT1,BAT2. For example, the capacity of the battery may be substantially degraded after 1000 charging cycles. In an embodiment, the inductance of the conductor CBL2 between the battery BAT1 and the capacitor CA (and or CB) may be selected to be high enough such that repetitive charging and discharging of the capacitors CA, CB at the fundamental frequency $f_0$ does not substantially reduce the operating life of the battery BAT1. For this purpose, the battery BAT1, BAT2 may be connected to the capacitors by using one or more inductors (see FIG. 7d).

In an embodiment, the amount of energy stored in the battery BAT1 may be monitored by measuring the voltage of the battery BAT1. For example, the amount of energy stored in the battery BAT1 may be estimated from the voltage $V_{CA}$, and the amount of energy stored in the battery BAT2 may be estimated from the voltage $V_{CB}$.

In case of lead-acid battery, the amount of energy stored in the battery BAT1, BAT2 may be determined also from the density of the electrolyte of the battery and/or from the refractive index of the electrolyte of the battery. The power conditioning device 600 may comprise a density sensor, which is arranged to provide a signal indicative of the density of the electrolyte of a battery BAT1, BAT2. The power conditioning device 600 may comprise a refractive index sensor, which is arranged to provide a signal indicative of the refractive index of the electrolyte of a battery BAT1, BAT2. The power conditioning device 600 may be arranged to control operation of the rectifier-inverter unit 300 based on a signal obtained from the refractive index sensor and/or based on a signal obtained from the density sensor. Monitoring the density and/or refractive index may be used also in case of the energy storage units shown e.g. in FIGS. 7c-7e.

A battery BAT1, BAT2 may comprise several electrochemical cells connected in series, and the battery may have one or more intermediate nodes.

Figure 7C:
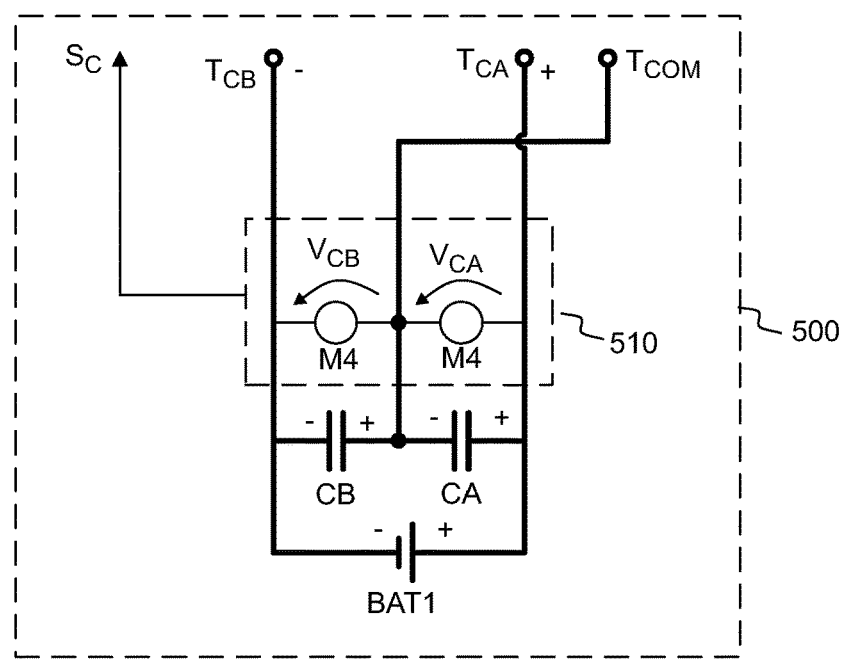
FIG. 7c shows an energy storage unit, which comprises capacitors and a battery, wherein the battery does not have an intermediate terminal connected to the common node of the capacitors.

Referring to FIG. 7c, the positive node of the capacitor CA and the negative node of the capacitor CB may be connected to the positive and negative terminals of a battery BAT1 such that said battery does not have an intermediate terminal connected to the common node $T_{COM}$. This may simplify the mechanical and electrical structure of the power conditioning device 600, and may allow reducing the number of components. However, connecting an intermediate battery terminal to the common node $T_{COM}$ of the capacitors may facilitate keeping the capacitor voltages $V_{CA}$, $V_{CB}$ in an optimum voltage range e.g. when the load current is fluctuating in a random way.

Figure 7D:
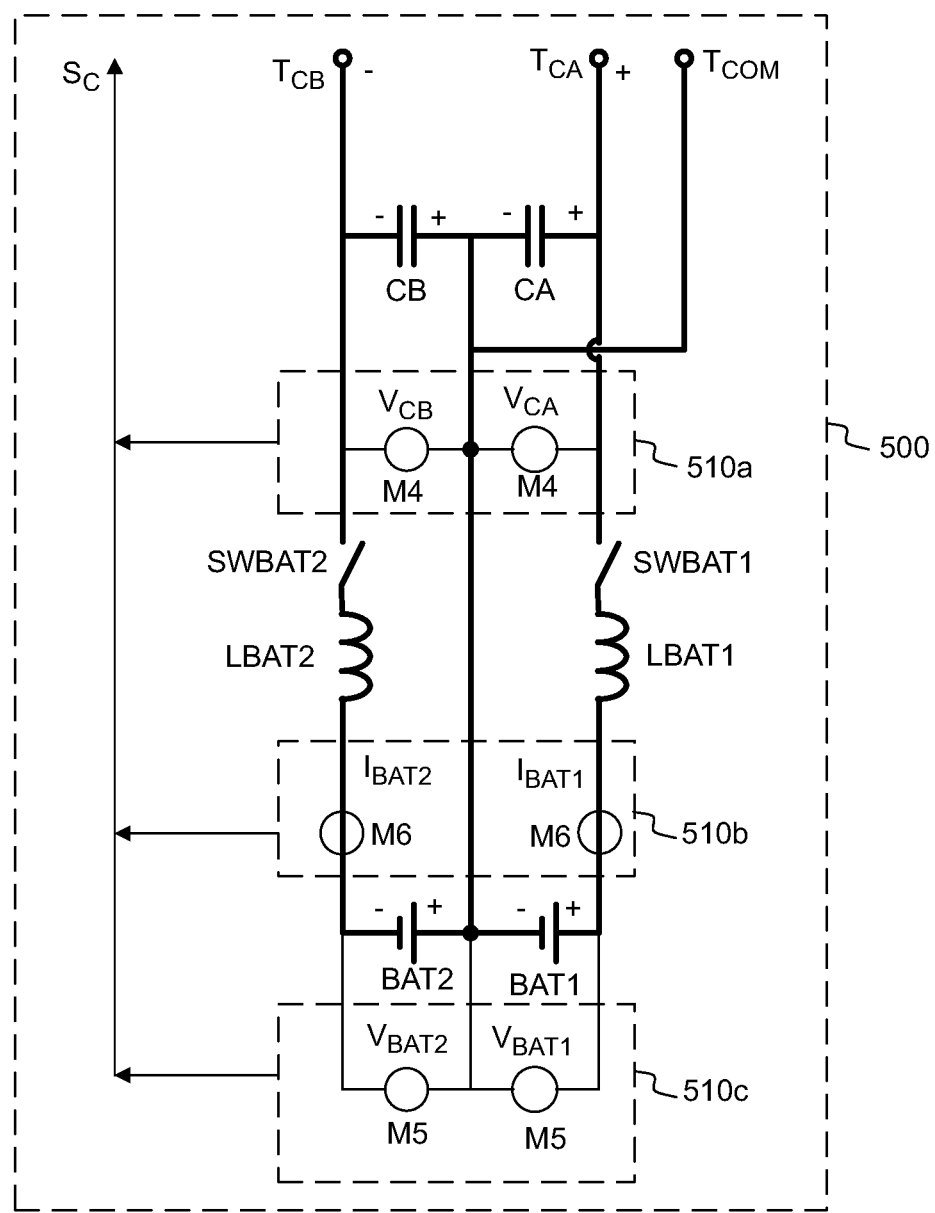
FIG. 7d shows an energy storage unit, wherein a battery is connected to the switch bridge via one or more inductors.

Referring to FIG. 7d, the positive terminal of the battery BAT1 may be normally connected to the capacitor CA, and the negative terminal of the battery BAT2 may be normally connected to the capacitor CB. The energy storage unit 500 may further comprise a switch SWBAT1 for temporarily disconnecting the battery BAT1 from the capacitor CA and/or a switch SWBAT2 for temporarily disconnecting the battery BAT2 from the capacitor CB.

Disconnecting a battery BAT1, BAT2 may facilitate accurate measurement of the charging state of the battery BAT1, BAT2. Disconnecting a battery BAT1, BAT2 may facilitate detecting and replacing a defective battery.

The batteries BAT1, BAT2 may be connected to the capacitors CA, CB via inductors LBAT1, LBAT2. The inductors LBAT1, LBAT2 may reduce voltage fluctuations at the terminals of the batteries, thereby increasing the operating life of the batteries. The inductances of the inductors LBAT1, LBAT2 may be selected to be high enough such that repetitive charging and discharging of the capacitors CA, CB at the fundamental frequency $f_0$ does not substantially reduce the operating life of the battery BAT1.

The power conditioning device 600 may comprise voltage sensors M5 for monitoring the voltages $V_{BAT1}$, $V_{BAT2}$ of the batteries BAT1, BAT2. The sensors M5 may provide a signal $S_C$ indicative of the voltage $V_{BAT1}$ and/or $V_{BAT2}$. The power conditioning device 600 may be arranged to monitor the state of the batteries BAT1, BAT2 based on the voltages $V_{BAT1}$, $V_{BAT2}$. The power conditioning device 600 may comprise a monitoring unit 510c, which comprises the sensors M5.

The power conditioning device 600 may comprise current sensors M6 for monitoring charging and/or discharging currents $I_{BAT1}$, $I_{BAT2}$ of the batteries BAT1, BAT2. The sensors M6 may provide a signal $S_C$ indicative of the current $I_{BAT1}$ and/or $I_{BAT2}$. The amount of energy stored in the battery BAT1, BAT2 may be determined e.g. by integrating the current $I_{BAT1}$, $I_{BAT2}$. The power conditioning device 600 may comprise a monitoring unit 510b, which comprises the sensors M6.

The power conditioning device 600 may comprise voltage sensors M4 for monitoring voltages $V_{CA}$, $V_{CB}$ of the capacitors CA, CB. The sensors M4 may provide a signal $S_c$ indicative of the voltage $V_{CA}$ and/or $V_{CB}$. The power conditioning device 600 may comprise a monitoring unit 510a, which comprises the sensors M4.

A signal $S_C$ indicative of the capacitor voltage $V_{CA}$, $V_{CB}$, indicative of the amount of energy stored in the battery BAT1, BAT2, and/or indicative of the discharge current $I_{BAT1}$, $I_{BAT2}$, may be provided and communicated to the control unit 400.

The energy storage unit 500 may optionally comprise one or more inductors LBAT1, LBAT2 for reducing the magnitudes of alternating current components coupled to the battery BAT1, BAT2. This may increase the operating life of the battery BAT1, BAT2. The inductance LBAT1 between the battery BAT1 and the capacitor CA (and or CB) may be selected high enough such that repetitive charging and discharging of the capacitor CA at the fundamental frequency $f_0$ does not substantially reduce the operating life of the battery BAT1.

Figure 7E:
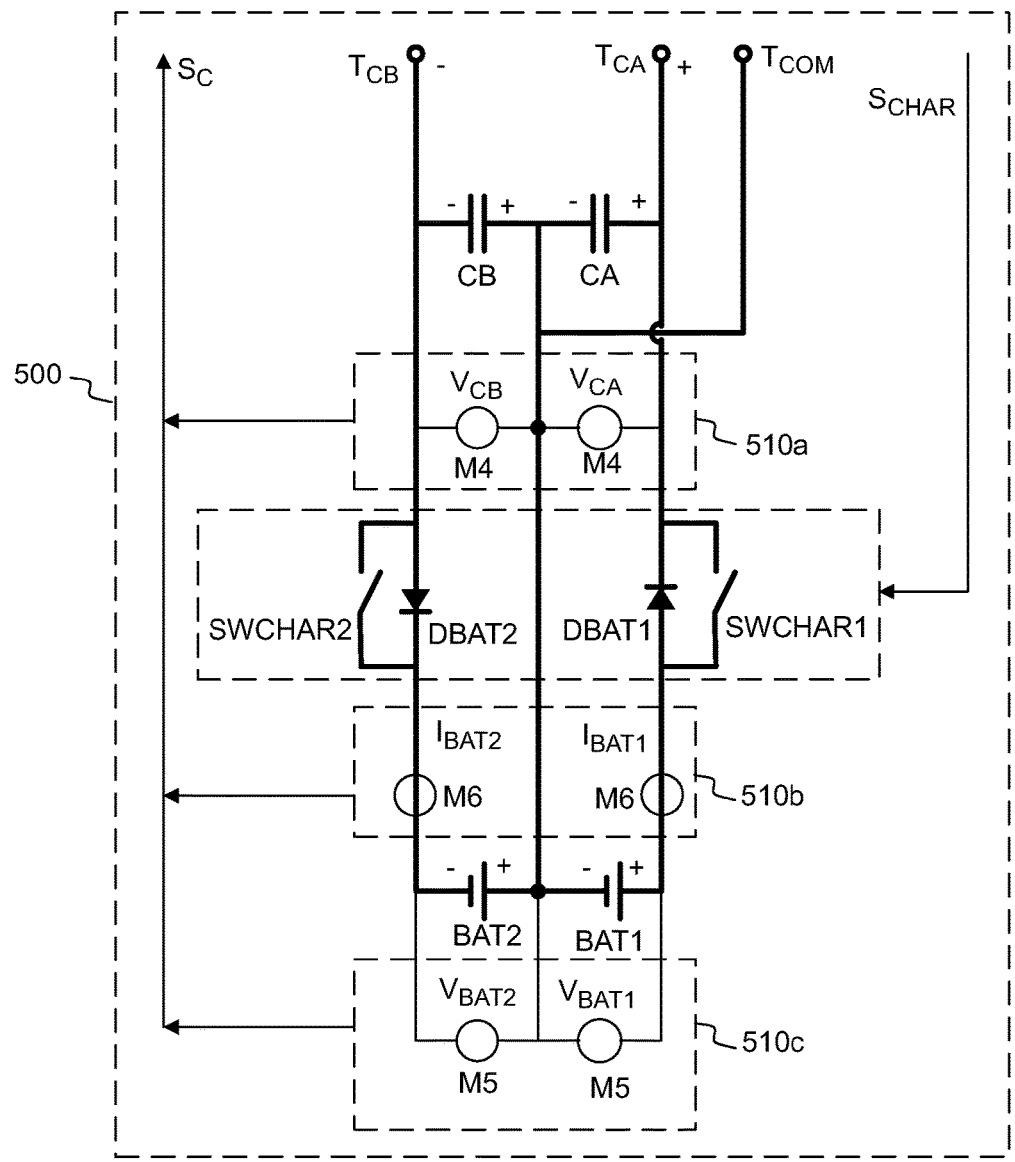
FIG. 7e shows an energy storage unit, wherein a battery is connected to the switch bridge via one or more diodes.

Referring to FIG. 7e, the power conditioning device 600 may comprise one or more diodes DBAT1, DBAT2, which are arranged to protect the batteries BAT1, BAT2 of the energy storage unit 500. During normal operation, the voltages $V_{CA}$, $V_{CB}$ of the capacitors CA, CB may be kept at a level, which substantially prevents discharging of the batteries BAT1, BAT2. In particular, the voltages $V_{CA}$, $V_{CB}$ of the capacitors CA, CB may be kept slightly higher than the voltages $V_{BAT1}$, $V_{BAT2}$ of the batteries BAT1, BAT2. This may increase the operating life of the batteries BAT1, BAT2. This may facilitate measuring the charging state of the battery BAT1, BAT2.

In the reserve power MODE2 (e.g. during the voltage sag), voltage of the capacitors CA, CB may be decreased such that the batteries may be discharged via the diodes DBAT1, DBAT2.

The diodes DBAT1, DBAT2 may be arranged to prevent charging of the batteries BAT1, BAT2 via said diodes. The power conditioning device 600 may optionally comprise switches SWCHAR1, SWCHAR2 for charging the batteries BAT1, BAT2 by using the switch bridge 200. The switch SWCHAR1 may temporarily connect the positive terminal of the battery BAT1 to the node $T_{CA}$ for charging the battery BAT1. The switch SWCHAR1 may be opened (i.e. set to the disconnecting state) so that charging of the battery BAT1 from the node $T_{CA}$ is prevented and discharging of the battery BAT1 to the node $T_{CA}$ can take place through the diode DBAT1. The switches SWCHAR1, SWCHAR2 may be controlled e.g. by a control signal $S_{CHAR}$ obtained from the control unit 400. The switches SWCHAR1, SWCHAR2 may be semiconductor devices (e.g. transistors) or electromechanical switches. The switches SWCHAR1, SWCHAR2 may be omitted if the device 600 comprises an auxiliary battery charger (not shown).

The energy storage units 500 shown in FIGS. 7d and 7e may also be implemented so that the intermediate terminal of the batteries BAT1, BAT2 is not connected to the common node $T_{COM}$.

Referring to FIGS. 7b to 7e, the switch bridge 200 and the inductor unit 100 may be arranged to operate also as a charger, which charges the battery BAT1 and/or BAT2 during the normal operating mode (MODE1). In an embodiment, the batteries may be charged substantially simultaneously with generating the compensating currents. The rectifier-inverter 300 may charge the batteries by transferring energy from the network. The rectifier-inverter 300 may provide compensating currents by transferring energy from the network, and by returning substantially less than 100% of said transferred energy back to the network.

Figure 8A:
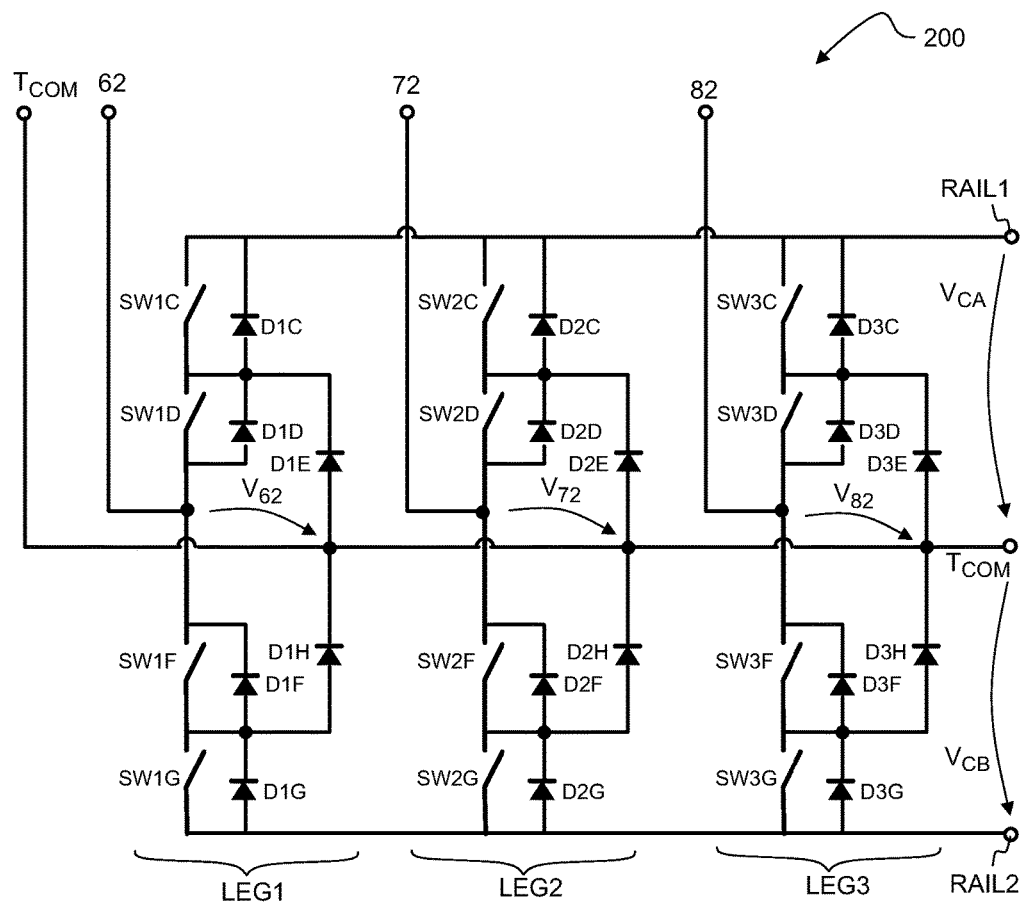
FIG. 8a shows a three-level switch bridge arranged to provide three different voltage levels.

Referring to FIG. 8a, the power conditioning device 600 may also comprise a three-level switch bridge 200 instead of the two-level switch bridge 200 shown in FIG. 5. Each leg of the three-level switch bridge 200 may provide three different leg voltage levels ($-V_{CB}$, 0, and $V_{CA}$).

Thanks to using the three level bridge, the switching frequency $f_{MOD}$ of an individual switch may be reduced when compared with the two level bridge. Thanks to using the three level bridge, the maximum voltage difference applied to an individual switch may be reduced when compared with the two level bridge. The switches may be e.g. IGBT transistors or MOSFET transistors. The switches may be controlled by a control signal $S_B$ obtained from the control unit 400. The switches may be controlled based on a control signal $S_B$ obtained from the control unit 400.

The first leg LEG1 of the switch bridge 200 may comprise switches SW1C, SW1D, SW1F, SW1G, and diodes D1C, D1D, D1E, D1F, D1G, DIN. The common node of the diodes D1E, D1H may be connected to the common node $T_{COM}$. The switch SW may be connected to the node $T_{CA}$ of the capacitor CA. The switch SW1G may be connected to the node $T_{CB}$ of the capacitor CB. The common node 62 of the switches SW1D, SW1F may be connected to the inductor L1 (FIG. 5). The node 62 may have three different voltage levels ($-V_{CB}$, 0, and $V_{CA}$) with respect to the voltage of the common node $T_{COM}$.

The second leg LEG2 of the switch bridge 200 may comprise switches SW2C, SW2D, SW2F, SW2G, and diodes D2C, D2D, D2E, D2F, D2G, D2H. The common node of the diodes D2E, D2H may be connected to the common node $T_{COM}$. The switch SW2C may be connected to the node $T_{CA}$ of the capacitor CA. The switch SW2G may be connected to the node $T_{CB}$ of the capacitor CB. The common node 72 of the switches SW2D, SW2F may be connected to the inductor L2 (FIG. 5). The node 72 may have three different voltage levels ($-V_{CB}$, 0, and $V_{CA}$) with respect to the voltage of the common node $T_{COM}$.

The third leg LEG3 of the switch bridge 200 may comprise switches SW3C, SW3D, SW3F, SW3G, and diodes D3C, D3D, D3E, D3F, D3G, D3H. The common node of the diodes D3E, D3H may be connected to the common node $T_{COM}$. The switch SW3C may be connected to the node $T_{CA}$ of the capacitor CA. The switch SW3G may be connected to the node $T_{CB}$ of the capacitor CB. The common node 82 of the switches SW3D, SW3F may be connected to the inductor L3 (FIG. 5). The node 82 may have three different voltage levels ($-V_{CB}$, 0, and $V_{CA}$) with respect to the voltage of the common node $T_{COM}$.

Figure 8B:
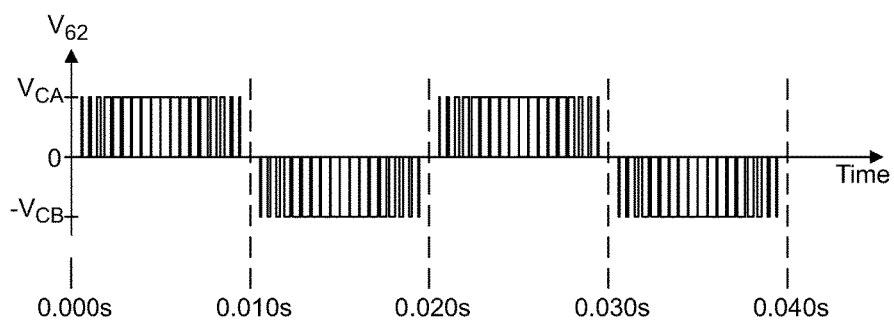
FIG. 8b shows, by way of example, voltage of a node of a three-level switch bridge.

The compensating currents $I_{1T}$, $I_{2T}$, $I_{3T}$ may be provided by modulating the inductor currents $I_{1E}$, $I_{2E}$, $I_{3E}$. The inductor currents $I_{1E}$, $I_{2E}$, $I_{3E}$ may be modulated by modulating the voltages of the nodes 62, 72, 82. FIG. 8b shows schematically how the voltage $V_{62}$ of the node 62 may be modulated e.g. for providing a substantially sinusoidal compensating current $I_{1T}$.

The switches of each leg should be driven such that the nodes $T_{CA}$, $T_{COM}$, $T_{CB}$ are not short-circuited to each other.

Each leg LEG1, LEG2, LEG3 of the three-level switch bridge 200 may have three states −1,0,1, corresponding to the different leg voltages $-V_{CB}$, 0, and $V_{CA}$. Thus, the three-level switch bridge 200 may have 27 (=$3^3$) different states corresponding to the different states of the legs LEG1, LEG2, LEG3. Each state of the bridge may represented by a switching vector. Each switching vector may be defined by defining the states of the individual legs LEG1, LEG2, LEG3. Each switching vector may also be represented by a symbol (e.g. $u_0$), as shown in Table 3.

TABLE 3

Switching vectors of a three-level switch bridge 200.

| Symbol notation | Element notation |
|---|---|
| $sw_0$ | (0,0,0) |
| $sw_{0+}$ | (1,1,1) |
| $sw_{0-}$ | (−1−1−1) |
| $sw_{01+}$ | (1,0,0) |
| $sw_{01-}$ | (0,−1,−1) |
| $sw_1$ | (1,−1,−1) |
| $sw_{12}$ | (1,0,−1) |
| $sw_{02+}$ | (1,1,0) |
| $sw_{02-}$ | (0,0,−1) |
| $sw_2$ | (1,1,−1) |
| $sw_{23}$ | (0,1,−1) |
| $sw_{03-}$ | (0,1,0) |
| $sw_{03+}$ | (−1,0,1) |
| $sw_3$ | (−1,1,−1) |
| $sw_{34}$ | (−1,1,0) |
| $sw_{04+}$ | (0,1,1) |
| $sw_{04-}$ | (−1,0,0) |
| $sw_4$ | (−1,1,1) |
| $sw_{45}$ | (−1,0,1) |

TABLE 3-continued

Switching vectors of a three-level switch bridge 200.

| Symbol notation | Element notation |
|---|---|
| $sw_{05+}$ | (0,0,1) |
| $sw_{05-}$ | (−1,−1,0) |
| $sw_5$ | (−1,−1,1) |
| $sw_{56}$ | (0,−1,1) |
| $sw_{06+}$ | (1,0,1) |
| $sw_{06-}$ | (0,−1,1) |
| $sw_6$ | (1,−1,1) |
| $sw_{61}$ | (1,−1,0) |

The first element of a switching vector may define the state of the first leg LEG1, the second element of the switching vector may define the state of the second leg LEG2, and the third element of the switching vector may define the state of the third leg LEG2. For example, the notation (−1,0,1) means that the first leg LEG1 is in the state −1 (voltage of the node 62 is substantially equal to $-V_{CB}$, the second leg LEG2 is in the state 0 (voltage of the node 72 is substantially equal to zero), and the third leg LEG3 is in the state 1 (voltage of the node 82 is substantially equal to $V_{CA}$). The different states of the bridge 200 may be implemented by controlling the switches of the bridge.

Figure 9:
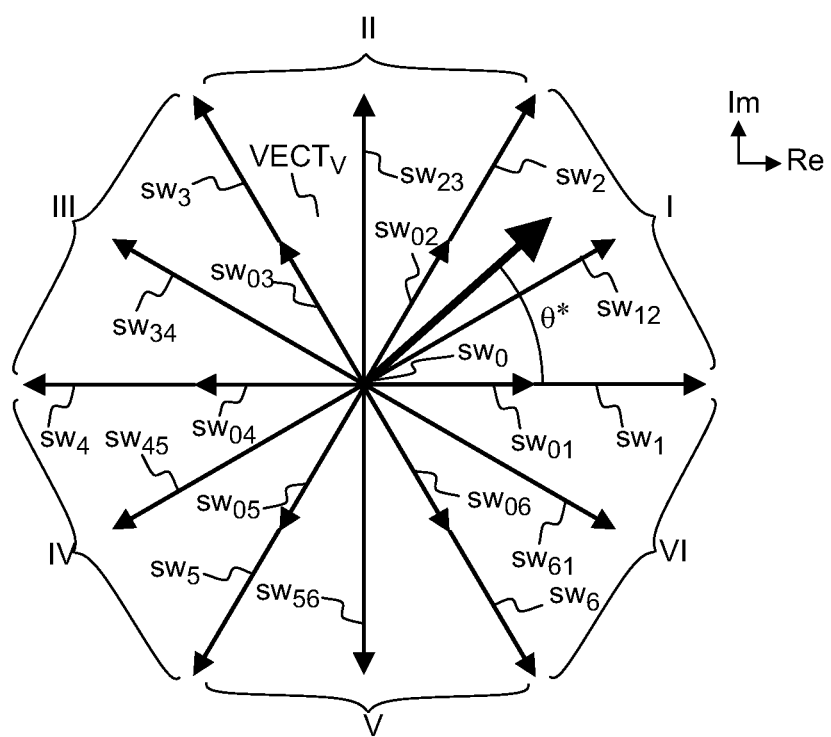
FIG. 9 shows a vector diagram related to controlling the three-level switch bridge.

FIG. 9 shows the length and orientation of the switching vectors in the complex plane. Each switching vector has a certain length and a certain phase angle θ in the complex plane (e.g. with respect to the real axis Re). For example, the phase angle of the switching vector $sw_1$ may be equal to 0°, and the phase angle of the switching vector $sw_2$ may be equal to 60°.

The switch bridge 200 may be operated according to a switching sequence, which comprises applying several different switching vectors in consecutive order, wherein each switching vector has a certain effect on the magnitude and the phase angle of the compensating currents $I_{1D}$, $I_{2D}$, $I_{3D}$ The three level switch bridge 200 of FIG. 8a may have 27 different switching vectors. The switching vectors $sw_1$, $sw_{12}$, $sw_2$, $sw_{23}$, $sw_3$, $sw_{34}$, $sw_4$, $sw_{45}$, $sw_5$, $sw_{56}$, $sw_6$, $sw_{61}$ may be called as active switching vectors. The switching vectors $sw_0$, $sw_{0+}$, $sw_{0-}$, $sw_{01+}$, $sw_{01-}$, $sw_{02+}$, $sw_{02-}$, $sw_{03+}$, $sw_{03-}$, $sw_{04+}$, $sw_{04-}$, $sw_{05+}$, $sw_{05-}$, $sw_{06+}$, $sw_{06-}$ are redundant switching vectors, which may be used for controlling the voltage balance of the capacitors CA, CB. A switching vector may be classified to be a redundant switching vector if also another switching vector has the same length and the same phase angle in the complex plane. As a special case, the redundant switching vectors $sw_0$, $sw_{0+}$, $sw_{0-}$ are zero sequence switching vectors, which do not have a phase angle in the complex plane. A redundant switching vector (e.g. $sw_{01+}$) and a complementary redundant switching vector ($sw_{01-}$) may have the same effect on the magnitude and the phase angle of the compensating currents $I_{1D}$, $I_{2D}$, $I_{3D}$, but they may have a different effect on the voltage balance of the capacitors CA, CB.

The desired compensating currents $I_{1D}$, $I_{2D}$, $I_{3D}$ may be generated by controlling the switch bridge 200 according to a modulation sequence. The switching vectors of the modulation sequence may be selected according to a voltage reference vector $VECT_V$, according to the desired compensating currents $I_{1D}$, $I_{2D}$, $I_{3D}$, and according to the charging state of the capacitors CA, CB. The voltage reference vector $VECT_V$ may be determined e.g. as was discussed in the context of two level switch bridge (see FIG. 6c). In case of a two level bridge, e.g. two active switching vectors closest to the reference vector VECT$_V$ may be used during a modulation period T$_{MOD}$. In case of a three level bridge, e.g. three or four active switching vectors closest to the reference vector VECT$_V$ may be used during a modulation period T$_{MOD}$. The modulation period T$_{MOD}$ may have a first half period and a second half period. The first modulation half period may be started e.g. by using a redundant switching vector. The next switching vectors may be chosen so that switch states in only one leg of the bridge are changed at a time. Thus, the switching frequency f$_{MOD}$, and corresponding switching losses of each individual switch may be minimized. The redundant switching vectors may be chosen according to the voltage balance status of the capacitors CA, CB, and according to the direction of the inductor currents I$_{1D}$, I$_{2D}$, I$_{3D}$. During the second modulation half period, the switching vectors may be applied in the reverse order.

By using the three level switch bridge 200, the switching frequency f$_{MOD}$ of an individual switch (e.g. the switch SW1C) may be reduced without a need to increase the inductance of the inductors L1, L2, L3. For example, the switching frequency f$_{MOD}$ may be in the range of 2 kHz to 50 KHz. For example, the switching frequency f$_{MOD}$ of the switch SW1C may be in the range of 2 kHz to 50 KHz.

During the normal operating mode MODE1, the voltage reference vector VECT$_V$ and the zero-sequence voltage reference u$_z$* used for controlling the operation of the switch bridge 200 may be determined from measured voltage values V$_{1T}$, V$_{2T}$, V$_{3T}$.

During the reserve power mode MODE2, the voltage reference vector VECT$_V$ and the zero-sequence voltage reference u$_z$* used for controlling the operation of the switch bridge 200 may be determined from auxiliary voltage values V$_{1A}$, V$_{2A}$, V$_{3A}$, which may be generated by a function generator. The auxiliary voltage values V$_{1A}$, V$_{2A}$, V$_{3A}$, may be generated by a numerical function generator. In other words, the measured voltage values V$_{1T}$, V$_{2T}$, V$_{3T}$ may be replaced with artificially generated voltage values in order to provide stable voltage output also in the reserve power mode MODE2. The function generator may be arranged to generate substantially sinusoidal voltage waveforms at a function generator frequency f$_G$, which may be substantially equal to the normal fundamental frequency f$_0$ of the input nodes IN1, IN2, IN3.

Figure 10:
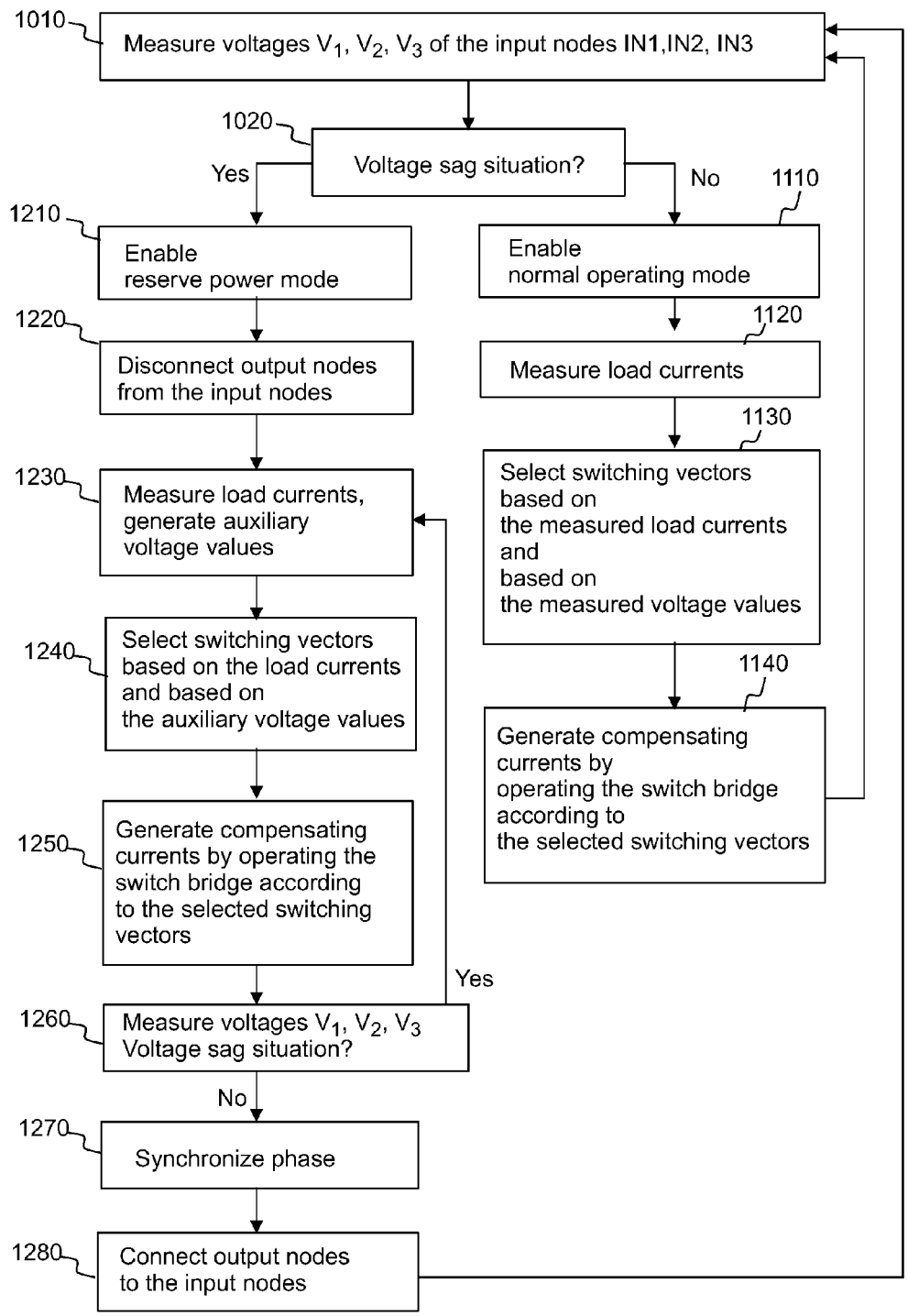
FIG. 10 shows method steps for generating compensating currents.

When returning to normal operation, after an abnormal situation has ceased, the phase angle of the auxiliary voltage values V$_{1A}$, V$_{2A}$, V$_{3A}$ may be synchronized with the phase angle of the measured voltage values V$_{1T}$, V$_{2T}$, V$_{3T}$, before connecting the output nodes T1, T2, T3 to the input nodes IN1, IN2, IN3, FIG. 10 shows method steps for operating the power conditioning device 600. The voltages V$_1$, V$_2$, V$_3$, of the input nodes IN1, IN2, IN3 may be monitored in step 1010. The measured voltages V$_1$, V$_2$, V$_3$ or voltage differences may be compared with one or more threshold voltage values (V$_{MN}$, THR1) in order to detect a voltage sag situation in step 1020. If the criterion for a voltage sag situation is not fulfilled, operation in the normal mode MODE1 may be enabled in step 1110. Load currents I$_{1L}$, I$_{2L}$, I$_{3L}$ may be measured in step 1120. Switching vectors for the modulation sequences may be selected in step 1130 based on the measured voltages V$_1$, V$_2$, V$_3$ and based on the measured load currents I$_{1L}$, I$_{2L}$, I$_{3L}$. The switch bridge may be operated according to the modulation sequences in step 1140 in order to generate the desired compensating currents I$_{1D}$, I$_{2D}$, I$_{3D}$ for compensating non-active current components. The step 1140 may comprise e.g. compensating reactive current components, suppressing harmonic components and/or balancing load currents. The voltages V$_1$, V$_2$, V$_3$, of the input nodes IN1, IN2, IN3 may be measured again in step 1010.

If the criterion for a voltage sag situation is fulfilled in step 1020, operation in the reserve power mode MODE2 may be enabled in step 1210. The output nodes T1, T2, T3 may be disconnected from the input nodes IN1, IN2, IN3 in step 1220. The load currents I$_{1L}$, I$_{2L}$, I$_{3L}$ may be measured and the auxiliary voltage values V$_{1A}$, V$_{2A}$, V$_{3A}$ may be generated in step 1230. Switching vectors for the modulation sequences may be selected in step 1240 based on the generated auxiliary voltages V$_{1A}$, V$_{2A}$, V$_{3A}$ and based on the measured load currents I$_{1L}$, I$_{2L}$, I$_{3L}$. The switch bridge 200 may be operated according to the modulation sequences in step 1250 in order to generate the desired load currents I$_{1L}$, I$_{2L}$, I$_{3L}$. The voltages V$_1$, V$_2$, V$_3$, of the input nodes IN1, IN2, IN3 may be measured again in step 1260. If the criterion for a voltage sag situation is still fulfilled, the method steps starting from step 1230 may be repeated.

If the criterion for a voltage sag situation is not fulfilled, the switch bridge 200 may be operated such that the voltages V$_{1T}$, V$_{2T}$, V$_{3T}$ of the output nodes T1, T2, T3 are synchronized with the line voltages V$_1$, V$_2$, V$_3$, of the input nodes IN1, IN2, IN3 in step 1270. The output nodes T1, T2, T3 may be connected to the input nodes IN1, IN2, IN3 in step 1280. After this, the method steps starting from step 1010 may be repeated.

The power conditioning device 600 may be arranged to compensate one or more non-active current components caused by the load 800. In particular, the power conditioning device 600 may be compensate distorted current waveform. Thus, the device 600 may prevent electrical disturbances generated by the load 800 from propagating via the network 900 to other devices. Thanks to using the compensating currents, the currents I$_{1T}$, I$_{2T}$, I$_{3T}$ drawn from the supply 800 may be substantially sinusoidal. In particular, the corrected waveforms of the input currents I$_{1T}$, I$_{2T}$, I$_{3T}$ may comply with power quality specifications adopted by an electricity distribution network operator.

The load 800, which causes non-active current components (e.g. waveform distortion and/or phase imbalance) may comprise e.g. a variable speed drive, an electric motor during rapid change of rotation speed, a transformer operating near saturation, a gas discharge lamp, a solid state rectifier, a welding device, or an arc furnace.

The power conditioning device 600 may be manufactured and/or transported such that it does not comprise the switch unit 470, the voltage monitoring unit 460, the load current monitoring unit 410, the output voltage monitoring unit 415, the energy storage unit 500 and/or the user interface 450. One or more of said units may be added to the power conditioning device 600 e.g. when the power conditioning device 600 is connected to be a part of the network 900. The user interface 450 does not need to be permanently connected to the power conditioning device 600.

The control unit 400 may be arranged to operate such that the control signal S$_{SWM}$ transmitted to the switch unit 470 may have a first value when an abnormal situation is detected. The abnormal situation may be detected e.g. by monitoring the voltages V$_1$, V$_2$, V$_3$ of the input nodes IN1, IN2, IN3 of the network 900. The control unit 400 may be arranged to operate such that the control signal S$_{SWM}$ transmitted to the switch unit 470 may have a second value after the instantaneous voltages V$_1$, V$_2$, V$_3$ of the input nodes IN1, IN2, IN3 have been detected to be normal after the abnormal situation. For example, the first value of the control signal S$_{SWM}$ may be equal to logical zero (or one), and the second value may be equal to logical one (or zero).

For example, the logical zero may be represented by a vector (0,0,0), where the first element of the vector may indicate a control value for the first switch SWM1 of the switch unit 470, the second element of the vector may indicate a control value for the second switch SWM2 of the switch unit 470, and the third element of the vector may indicate a control value for the third switch SWM3 of the switch unit 470. For example, the logical one may be represented by a vector (1,1,1). The control signal $S_{SWM}$ may have e.g. a vector value (1,1,1) or (0,0,0). The switch unit 470 may be arranged to disconnect the node IN1 from the node T1, disconnect the node IN2 from the node T2, and to disconnect the node IN3 from the node T3 when the control signal $S_{SWM}$ received by the switch unit 470 has the first value. The normal situation may be restored after the abnormal situation. The switch unit 470 may be arranged to connect the node IN1 to the node T1, to connect the node IN2 to the node T2, and to connect the node IN3 to the node T3 when the control signal $S_{SWM}$ received by the switch unit 470 has the second value. The restored normal situation may be detected e.g. by monitoring the instantaneous voltages $V_1, V_2, V_3$ of the input nodes IN1, IN2, IN3 of the network 900.

The control unit 400 may be configured to provide a first value (0,0,0) of the control signal $S_{SWM}$ when a voltage sag situation is detected, and switch unit 470 may be arranged to disconnect the first output node T1 from the first input node IN1, to disconnect the second output node T2 from the second input node IN2, and to disconnect the third output node T3 from the third input node IN3 when the switch unit 470 receives the control signal $S_{SWM}$, which has the first value.

The control unit 400 may be configure to provide a second value (1,1,1) of the control signal $S_{SWM}$ after the instantaneous voltages $V_1, V_2, V_3$ of the input nodes IN1, IN2, IN3 are detected to be normal after the voltage sag situation. The switch unit 470 may be arranged to connect the first output node T1 to the first input node IN1, to connect the second output node T2 to the second input node IN2, and to connect the third output node T3 to the third input node IN3 when the switch unit 470 receives the control signal $S_{SWM}$, which has the second value. The first input node IN1, the second input node IN2 and the third input node IN3 may be connected to the supply 700 in order to transfer energy from the supply 700 to the load 800 via the switch unit 470. The nodes IN1, IN2, IN3 may be connected to the supply 700 during the normal situation. The nodes IN1, IN2, IN3 may be connected to the supply 700 also during the abnormal situation. However, one or more of the nodes IN1, IN2, IN3 may sometimes be disconnected from the supply 700 during the abnormal situation, e.g. due to a temporary problem in the network 900. Thus, the nodes IN1, IN2, IN3 may be connected to the supply 700 at least during the normal situation.

Compensating phase imbalance may comprise generating the first compensating current $I_{1D}$ by transferring first energy from the first output node T1 to the capacitor CB by using the switch bridge 200 and the first inductor L1, and generating the second compensating current $I_{2D}$ by transferring second energy from the capacitor CB to the second output node T2 by using the switch bridge 200 and the second inductor L2, wherein the first energy and the second energy may be transferred during the same fundamental time period $T_0$.

The drawings are schematic. For the person skilled in the art, it will be clear that modifications and variations of the devices and methods according to the present invention are perceivable. The particular embodiments described above with reference to the accompanying drawings are illustrative only and not meant to limit the scope of the invention, which is defined by the appended claims.

The invention claimed is:

1. A device for generating compensating currents, the device comprising:
   a switch bridge,
   an inductor unit,
   an energy storage unit,
   a control unit,
   a signal input for receiving a first monitoring signal indicative of the voltages of input nodes of a three-phase alternating current network,
   a signal output for controlling a switch unit, and
   output nodes connectable to a load,
   wherein the control unit is configured to enable operation in a first operating mode when the first monitoring signal indicates a normal voltage situation, and the control unit is configured to enable operation in a second operating mode when the first monitoring signal indicates a voltage sag situation;
   wherein in the first operating mode:
      the switch bridge and the inductor unit are arranged to provide at least a first compensating current so as to compensate a non-active component of a load current drawn from a first output node, wherein the first compensating current is added to the load current at the first output node, and the switch bridge and the inductor unit are arranged to generate the first compensating current by transferring energy from the network to the energy storage unit, and by transferring energy back from the energy storage unit to the network; and
   in the second operating mode:
      the control unit is configured to send a control signal to the switch unit for disconnecting the input nodes from the output nodes, and
      the switch bridge and the inductor unit are arranged to provide at least a first auxiliary current so as to provide reserve power for the load during the voltage sag situation, wherein the switch bridge and the inductor unit are arranged to generate the first auxiliary current by transferring energy from the energy storage unit.

2. The device of claim 1 comprising the switch unit, wherein the switch unit is arranged to disconnect a first input node from the first output node, to disconnect a second input node from a second output node, and to disconnect a third input node from a third output node based on the control signal.

3. The device of claim 1 wherein the control unit is configured to select switching vectors for providing the first compensating current based on a measured load current, the energy storage unit comprises a capacitor, and the switch bridge and a first inductor of the inductor unit are arranged to transfer energy from the three-phase network to said capacitor and to return energy from the capacitor to the three-phase network so as to generate the first compensating current, wherein the switch bridge is arranged to alternately increase and decrease an inductor current of the first inductor by connecting the first inductor to the capacitor at a switching frequency such that an averaged value of the inductor current is substantially equal to the compensating current, wherein the switching frequency is in the range from 2 kHz to 50 kHz.

4. The device according to claim 1, wherein the control unit is configured to:

determine a voltage vector based on measured load currents and based on measured voltage values of the three-phase network, select switching vectors based on the determined voltage vector, determine durations for each selected switching vector based on the determined voltage vector, and drive the switch bridge by using the selected switching vectors and the determined durations.

5. The device according to claim 1 wherein the energy storage unit comprises a first capacitor and a second capacitor connected in series, and the common node of the capacitors is connected to a node of the neutral phase of the network.

6. The device according to claim 1 wherein the switch bridge and the inductor unit are arranged to transfer energy from the first output node to the energy storage unit, and to transfer energy from the energy storage unit to a second output node so as to compensate phase imbalance of the network.

7. The device of claim 1, wherein in the first operating mode, the control unit is configured to:

determine the non-active component of the load current by subtracting instantaneous values of a reference current from instantaneous values of the load current; and determine the first compensating current by multiplying the non-active current component by a coefficient of −1.

8. A method for generating compensating currents for a three-phase alternating current network, the method comprising:

enabling operation in a first operating mode when the three-phase alternating current network is detected to have normal voltages, enabling operation in a second operating mode when a voltage sag situation is detected;

wherein in the first operating mode:

a switch bridge and an inductor unit provide at least a first compensating current so as to compensate a non-active component of a load current drawn from a first output node, wherein the first compensating current is added to the load current at the first output node, and the switch bridge and the inductor unit generate the first compensating current by transferring energy from the network to an energy storage unit, and by transferring energy back from the energy storage unit to the network; and in the second operating mode:

the input nodes are disconnected from the output nodes by a switch unit, the switch bridge and the inductor unit provide at least a first auxiliary current so as to provide reserve power for the load during the voltage sag situation, wherein the switch bridge and the inductor unit generate the first auxiliary current by transferring energy from the energy storage unit.

9. The method of claim 8 wherein the energy storage unit comprises a capacitor, said method comprises transferring energy from the three-phase network to the capacitor and transferring energy from the capacitor back to the three-phase network so as to generate the first compensating current, wherein the switch bridge is arranged to alternately increase and decrease an inductor current of the first inductor by connecting the first inductor to the capacitor at a switching frequency such that an averaged value of the inductor current is substantially equal to the first compensating current, wherein the switching frequency is in the range from 2 kHz to 50 kHz.

10. The method of claim 8 comprising:

determining a voltage vector based on measured load currents and based on measured voltage values of the three-phase network, selecting switching vectors based on the determined voltage vector, determining durations for each selected switching vector based on the determined voltage vector, and driving the switch bridge by using the selected switching vectors and the determined durations.

11. The method according to claim 8 wherein the energy storage unit comprises a first capacitor and a second capacitor connected in series, and the common node of the capacitors is connected to a node of the neutral phase of the network.

12. The method according to claim 8 comprising disconnecting a first input node from the first output node, disconnecting a second input node from a second output node, and disconnecting a third input node from a third output node when the voltage sag situation is detected.

13. The method of claim 12 comprising connecting the first input node to the first output node, connecting the second input node to the second output node, and connecting the third input node to the third output node after the voltages of the input nodes have been detected to be normal after the voltage sag situation.

14. The method according to claim 8 comprising:

generating the first compensating current by transferring energy from the network to a capacitor of the energy storage by using the switch bridge and a first inductor of the inductor unit, and by transferring energy from said capacitor back to the network by using the switch bridge and the first inductor, wherein the switch bridge alternately increases and decreases an inductor current of the first inductor by connecting the first inductor to the capacitor at a switching frequency such that an averaged value of the inductor current is substantially equal to the compensating current, and the switching frequency is in the range from 2 kHz to 50 kHz.

15. The method according to claim 8 comprising transferring energy from the first output node to a capacitor of the energy storage unit, and transferring energy from said capacitor to the second output node during the same fundamental time period in order to compensate phase imbalance between a first phase and a second phase of the network.

16. The method according to claim 8 comprising generating the first compensating current by transferring first energy from the first output node to a capacitor of the energy storage by using the switch bridge and a first inductor of the inductor unit, and generating a second compensating current by transferring second energy from the capacitor to a second output node by using the switch bridge and a second inductor of the inductor unit, wherein the first energy and the second energy are transferred during the same fundamental time period in order to compensate phase imbalance between a first phase and a second phase of the network.

17. The method according to claim 8 wherein the switch bridge is a three-level switch bridge.

18. The method of claim 8, wherein in the first operating mode:

a control unit determines the non-active component of the load current by subtracting instantaneous values of a reference current from instantaneous values of the load current; and the control unit determines the first compensating current by multiplying the non-active current component by a coefficient of −1.

* * * * *